(12) United States Patent
Duncan

(10) Patent No.: US 9,618,120 B2
(45) Date of Patent: Apr. 11, 2017

(54) DEVICE WITH IMPROVED HEAT RESISTANCE

(71) Applicant: HONEYWELL INTERNATIONAL INC., Morristown, NJ (US)

(72) Inventor: Aaron Duncan, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/607,415

(22) Filed: Jan. 28, 2015

(65) Prior Publication Data

US 2016/0215885 A1    Jul. 28, 2016

(51) Int. Cl.

| F16J 15/22 | (2006.01) |
|---|---|
| F16J 15/06 | (2006.01) |
| F16J 15/10 | (2006.01) |
| D06M 11/77 | (2006.01) |
| D06N 3/04 | (2006.01) |
| D06N 3/12 | (2006.01) |
| F16L 57/04 | (2006.01) |
| F16L 59/14 | (2006.01) |
| F16L 23/18 | (2006.01) |

(52) U.S. Cl.
CPC ............ *F16J 15/065* (2013.01); *D06M 11/77* (2013.01); *D06N 3/047* (2013.01); *D06N 3/128* (2013.01); *F16J 15/104* (2013.01); *F16L 23/18* (2013.01); *F16L 57/04* (2013.01); *F16L 59/145* (2013.01); *D06N 2209/065* (2013.01)

(58) Field of Classification Search
CPC .. F16J 15/20; F16J 15/22; F16J 15/064; F16J 15/065; F16J 15/102; F16J 15/104
See application file for complete search history.

(56) References Cited

U.S. PATENT DOCUMENTS

| 4,443,517 A * | 4/1984 | Shah | F16J 15/102 162/181.9 |
|---|---|---|---|
| 4,468,043 A * | 8/1984 | Brazel | F16J 15/065 277/651 |
| 5,289,658 A * | 3/1994 | Lusen | F16B 2/243 277/637 |

(Continued)

FOREIGN PATENT DOCUMENTS

| DE | 20213477 U1 | 12/2002 |
|---|---|---|
| GB | 2184512 A | 6/1987 |

(Continued)

OTHER PUBLICATIONS

Ceramic Products; Ceramic Products-Ceramic Cloth and Ceramic Braided Packing; Shree Firepack Safety Privat Limited; [Retrieved from Internet Nov. 17, 2014].

(Continued)

*Primary Examiner* — Gilbert Lee

(74) *Attorney, Agent, or Firm* — Lorenz & Kopf, LLP

(57) ABSTRACT

Apparatus are provided for a device with improved heat resistance. The device includes a body and an encasing layer disposed substantially entirely around the body. The encasing layer includes a fabric layer and a coating. The fabric layer has a first end and a second end coupled together about the perimeter of the body to enclose the body, and the fabric layer includes an exterior surface. The coating is disposed on the exterior surface of the fabric layer, and the coating forms a barrier for the fabric layer.

19 Claims, 16 Drawing Sheets

(56) References Cited

U.S. PATENT DOCUMENTS

| | | | |
|---|---|---|---|
| 5,301,960 A * | 4/1994 | Meyer | F16J 15/22 |
| | | | 277/528 |
| 5,898,358 A | 4/1999 | Tompkins et al. | |
| 2011/0079965 A1* | 4/2011 | Dromain | F16J 15/027 |
| | | | 277/630 |

FOREIGN PATENT DOCUMENTS

| | | |
|---|---|---|
| JP | 2005282772 A | 10/2005 |
| WO | 0119610 A1 | 3/2001 |
| WO | 2014160665 A1 | 10/2014 |

OTHER PUBLICATIONS

Catalogue for Ceramic Products; Ceramic Products-Ceramic Cloth and Ceramic Braided Packing; Shree Firepack Safety Privat Limited; [Retrieved from Internet Nov. 17, 2014].
Vermiculite Coated Fiberflass; FlameShield 1500—Very High Temperature, Heat & Flame Resistant Thermal Insulating Fiberglass Fabric; [Retrieved from Internet Nov. 17, 2014].
Extended EP Search Report for Application No. 16152657.9-1303 dated Jun. 6, 2016.
EP Examination Report for Application No. 16152657.9-1303 dated Sep. 30, 2016.

* cited by examiner

DEVICE WITH IMPROVED HEAT RESISTANCE

TECHNICAL FIELD

The present disclosure generally relates to devices for use in high temperature applications, and more particularly relates to devices, such as gaskets, ducts, seals, hoses, bellows and joints, with improved heat resistance.

BACKGROUND

Many vehicles are subject to regulatory standards with regard to fire resistance for the safety of passengers of the vehicle. For example, certain parts of the vehicle may be subject to regulatory standards for fire resistance, such that a fire is unable to penetrate other areas of the vehicle. In addition, other devices may operate in a high temperature environment, in which the device may require heat resistance to perform as intended.

Accordingly, it is desirable to provide a device with improved heat resistance. Furthermore, other desirable features and characteristics of the present invention will become apparent from the subsequent detailed description and the appended claims, taken in conjunction with the accompanying drawings and the foregoing technical field and background.

SUMMARY

According to various embodiments, a device with improved heat resistance is provided. The device includes a body and an encasing layer disposed substantially entirely around the body. The encasing layer includes a fabric layer and a coating. The fabric layer has a first end and a second end coupled together about the perimeter of the body to enclose the body, and the fabric layer includes an exterior surface. The coating is disposed on the exterior surface of the fabric layer, and the coating forms a barrier for the fabric layer.

A device with improved heat resistance is provided, according to various embodiments. The device includes a body having a first end and a second end. The first end of the body is coupled to the second end of the body to form a closed perimeter. The device also includes an encasing layer disposed substantially entirely around the body. The encasing layer includes a fabric layer and a coating. The fabric layer has a first end and a second end sewn together about the perimeter of the body at a seam to enclose the body. The fabric layer includes an exterior surface. The coating is disposed on the exterior surface of the fabric layer, and the coating forms a barrier for the fabric layer.

Also provided according to various embodiments is a device with improved heat resistance. The device includes a seal body having a first end and a second end. The device also includes an encasing layer disposed substantially entirely around the seal body. The encasing layer includes a fabric layer and a coating. The fabric layer has a first end and a second end sewn together with a ceramic thread about the perimeter of the seal body at a seam to enclose the seal body. The fabric layer includes an exterior surface. The coating is disposed on the exterior surface of the fabric layer, and the coating forms a barrier for the fabric layer.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any number of systems that require a heat resistant barrier, such as a gasket, duct, hose, bellows, joint or seal. While many of the examples disclosed herein are directed towards a seal with improved fire or heat resistance for use with a duct system, the seal and the use of the teachings of this disclosure with a seal are merely one exemplary embodiment of the present disclosure. It should be noted that many alternative or additional functional relationships or physical connections may be present in an embodiment of the present disclosure.

Figure 1:
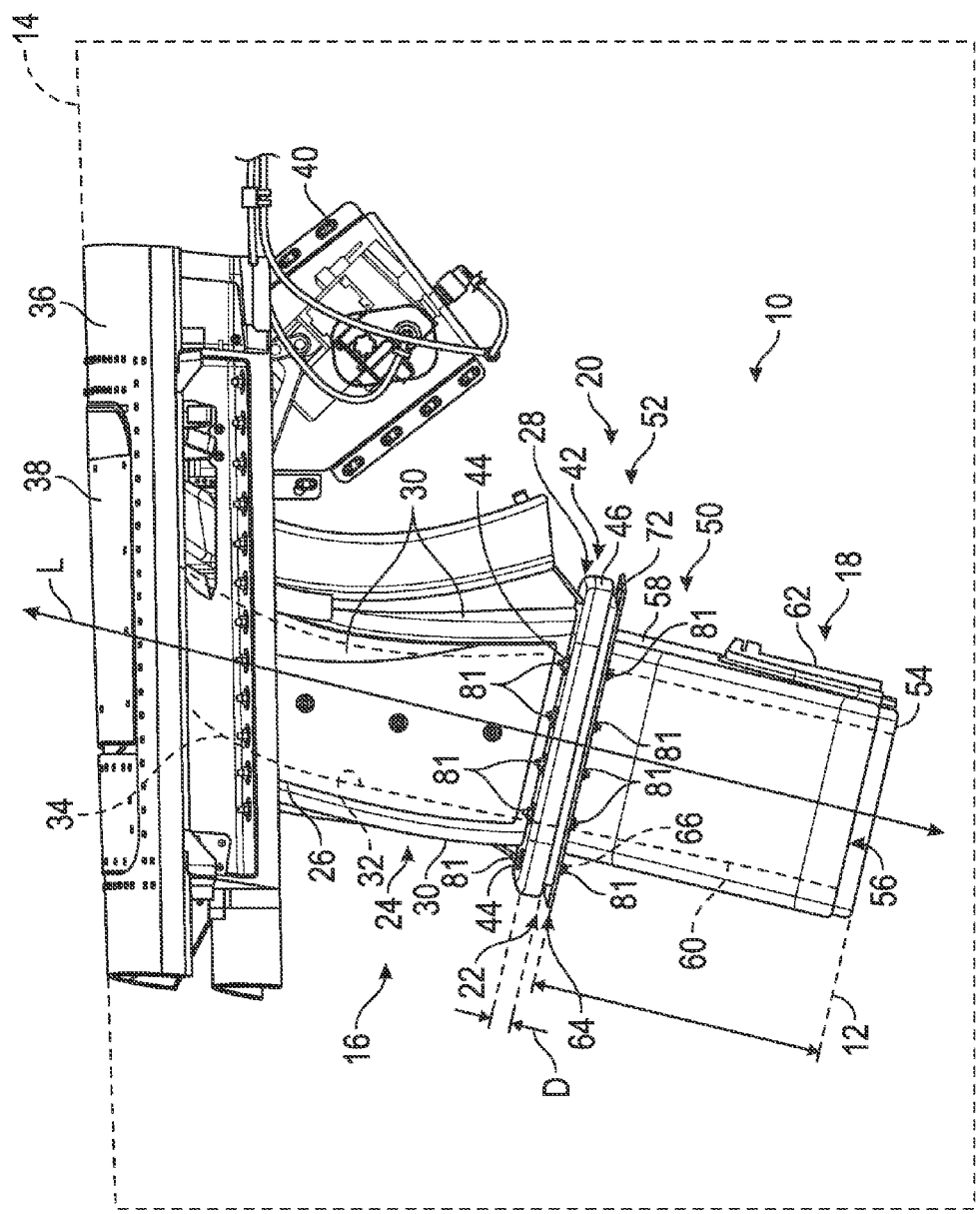
FIG. 1 is a schematic perspective illustration of a duct system that includes a device with improved heat resistance in accordance with various embodiments.

With reference to FIG. 1, a duct system 10 is shown. The duct system 10 can be in communication with or employed with an auxiliary power unit (APU) 12, which can provide auxiliary power to a vehicle 14. In one example, the vehicle 14 is an aircraft, but the vehicle 14 can be any suitable vehicle, such as a marine vessel, bus, spacecraft, etc. Further, it should be noted that the use of the duct system 10 with the APU 12 and vehicle 14 is merely exemplary, as the duct system 10 can be employed with any suitable fluid ducting system. The duct system 10 includes a first duct or inlet duct 16, a second duct or plenum 18, and a joint 20 between the inlet duct 16 and the plenum 18. As will be discussed in greater detail herein, the joint 20 includes a device with improved heat resistance or a seal 22. Although the figures shown herein depict an example with certain arrangements of elements, additional intervening elements, devices, features, or components may be present in an actual embodiment. It should also be understood that FIG. 1 is merely illustrative and may not be drawn to scale.

The inlet duct 16 includes a body 24, which defines a first end 26 and a second end 28. The body 24 can be composed of any suitable material, such as a metal or polymer. In one example, the body 24 is composed of a composite polymeric material. The body 24 includes a plurality of sides 30 between the first end 26 and the second end 28, which cooperate to define a duct or passage 32 through the body 24 to enable fluid to flow through the inlet duct 16. In one example, the plurality of sides 30 are arranged to define a polygonal (e.g., rectangular) duct or passage 32, however, the plurality of sides 30 can be arranged to form any desired shape. Further, the body 24 need not include a plurality of sides 30, but can also be annular, circular or cylindrical, with a single side. Thus, the inlet duct 16 illustrated herein is merely exemplary.

The first end 26 of the body 24 is coupled to an inlet 34. As the inlet 34 is generally known to those skilled in the art, the inlet 34 will not be discussed in great detail herein. Briefly, however, the inlet 34 can be defined through a skin structure 36 of the vehicle 14, such that fluid surrounding the vehicle 14 can be drawn in through the inlet 34. In various embodiments, a door 38 can cover the inlet 34. The door 38 is moveable between an opened and closed position (and positions therebetween) by an actuator 40 to open and close the inlet 34. With the door 38 in the opened position, fluid surrounding the vehicle 14 flows through the inlet 34, into the passage 32 and to the plenum 18.

The second end 28 of the body 24 is coupled to the joint 20. In one example, the second end 28 includes an outwardly extending flange 42. The flange 42 can be integrally formed from a terminal portion of one or more of the plurality of sides 30 of the body 24. In this example, the flange 42 extends outwardly from the second end 28 of the body 24 at about a 90 degree angle, however, the flange 42 can extend outwardly from the second end 28 at any suitable angle. The flange 42 couples the second end 28 of the body 24 to the plenum 18 at the joint 20, thereby enabling fluid to flow from the inlet 34, through the passage 32 and into the plenum 18. In one example, the flange 42 includes one or more throughbores 44 and an overhang 46. The throughbores 44 are sized and shaped to receive a suitable fastener to couple the flange 42 to the seal 22 at the joint 20, as will be discussed in greater detail herein. It should be noted that the flange 42 need not be coupled to the seal 22 at the joint 20, if desired. Rather, the flange 42 can abut or lie adjacent to the seal 70 at the joint to allow for relative movement between the inlet duct 16 and the plenum 18 at the joint 20.

The overhang 46 extends substantially downward from the flange 42, in a direction toward the plenum 18. Stated another way, the overhang 46 is substantially parallel to a longitudinal axis L defined through the duct system 10. In one example, the overhang 46 extends downward for a distance D to partially enclose a portion of the joint 20. It should be noted that the overhang 46 can extend downwardly for any desired distance, and thus, the distance D is merely exemplary. The overhang 46 can act as a drip shield, which can conduct fluid, such as water from condensation, down and away from the duct system 10.

The plenum 18 is coupled at the joint 20. The plenum 18 receives the fluid from the inlet duct 16. The plenum 18 has a body 50, which defines a first end 52 and a second end 54. The body 50 can be composed of any suitable material, such as a metal or polymer. In one example, the body 50 is composed of a composite polymeric material. The body 50 includes a plurality of first sides 56 and a plurality of second sides 58 between the first end 52 and the second end 54. The plurality of first sides 56 and the plurality of second sides 58 cooperate to define a chamber 60. In one example, the plurality of first sides 56 have a slight angle or curvature from the first end 52 to the second end 54 such that the body 50 has a greater width at the second end 54 than the first end 52, when measured in a direction substantially perpendicular to the longitudinal axis L. Each of the plurality of second sides 58 defines an aperture 62. The aperture 62 is substantially semi-circular. It should be noted that while the plenum 18 is described and illustrated herein as including both the plurality of first sides 56 and the plurality of second sides 58, the body 50 of the plenum 18 can have any number of sides and can have any suitable shape. Thus, the plenum 18 illustrated herein is merely exemplary.

With reference to FIG. 1, the second end 54 of the body 50 has an open perimeter due to the plurality of second sides 58. The second end 54 of the body 50 can be coupled to a mating structure to complete the plenum 18 and/or can be coupled to structure associated with the APU 12 as is generally known. The first end 52 of the body 50 includes an outwardly extending flange 64. The flange 64 can be integrally formed from a terminal portion of one or more of the plurality of first sides 56 and the plurality of second sides 58 of the body 50. In this example, the flange 64 extends outwardly from the first end 52 of the body 50 at about a 90 degree angle, however, the flange 64 can extend outwardly from the first end 52 at any suitable angle. The flange 64 couples the first end 52 of the body 50 to the inlet duct 16 at the joint 20, thereby enabling fluid to flow into the plenum 18.

In one example, the flange 64 includes one or more throughbores 66. The throughbores 66 are sized and shaped to receive a suitable fastener to couple the flange 64 at the joint 20. In one example, each of the throughbores 66 receives a mechanical fastener to couple the seal 22 to the flange 64, as will be discussed in greater detail herein. It should be noted that the flange 64 need not be coupled to the seal 22 at the joint 20, if desired. Rather, the flange 64 can abut or lie adjacent to the seal 70 at the joint to allow for relative movement between the inlet duct 16 and the plenum 18 at the joint 20.

Figure 2:
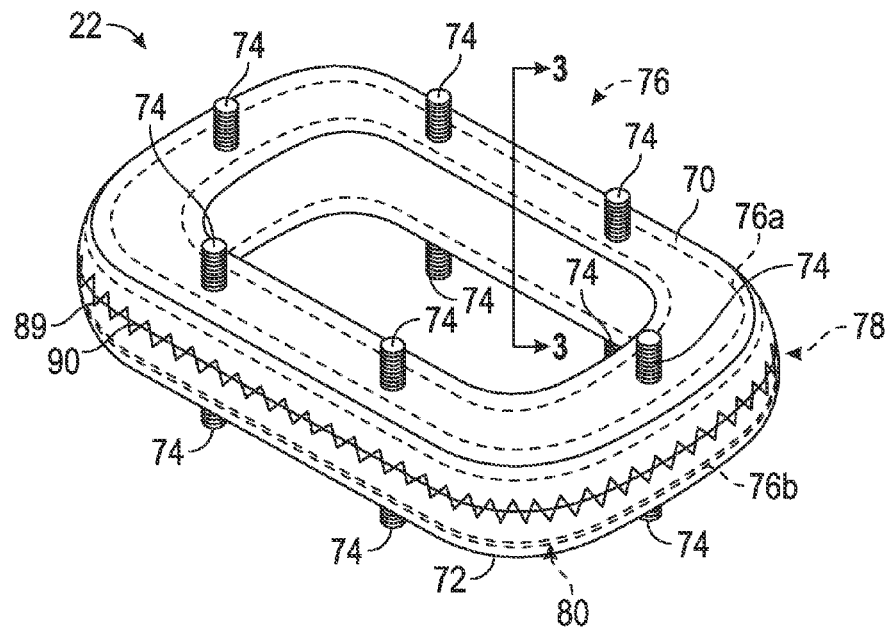
FIG. 2 is a perspective view illustrating the device of the duct system of FIG. 1 in accordance with various embodiments.

With reference to FIG. 2, the joint 20 between the inlet duct 16 and the plenum 18 includes the seal 22. The seal 22 is shaped and sized to cooperate with the flange 42 of the second end 28 of the inlet duct 16 and the flange 64 of the first end 52 of the plenum 18 (FIG. 1). In one example, the seal 22 includes a first face 70, a second face 72, one or more mechanical fasteners 74, one or more frames 76, an encasing layer 78 and a seal body 80.

The first face 70 is coupled to the flange 42 and seals against the flange 42 of the inlet duct 16 (FIG. 1). The second face 72 is coupled to the flange 64 and seals against the flange 64 of the plenum 18 (FIG. 1). In the example illustrated herein, the seal 22 is sized to extend about the perimeter of the flanges 42, 64 and is substantially rectangular, with a curved radius at corners of the seal 22. It should be understood, however, that the size and shape of the seal 22 is merely exemplary. In this regard, the seal 22 can be circular or have any polygonal shape that corresponds to the shape of the surfaces against which the seal 22 contacts for sealing.

The one or more mechanical fasteners 74 can be coupled to the one or more frames 76. In one example, the seal 22 includes a plurality of mechanical fasteners 74 coupled to the one or more frames 76 along each of the first face 70 and the second face 72. In this example, the mechanical fasteners 74 comprise threaded studs, which are sized to be received through respective ones of the throughbores 44, 66 to receive nuts, such as the nuts 81 illustrated in FIG. 1, to couple the flanges 42, 64 to the seal 22 at the joint 20. It should be understood that the use of threaded studs is merely exemplary, as any suitable technique can be used to couple the flanges 42, 64 to the seal 22, such as riveting, ultrasonic welding, etc. Furthermore, the mechanical fasteners 74 need not be coupled to each of the first face 70 and second face 72, but rather, can be coupled to one of the first face 70 and second face 72. In this regard, the seal 22 need not be coupled to both the flange 42 and the flange 64 at the joint 20, but rather, can be coupled to one of the flange 42 and the flange 64. In addition, the number of mechanical fasteners 74 illustrated herein is merely exemplary, as one or more mechanical fasteners 74 can be employed. While the mechanical fasteners 74 are also illustrated herein as having about a same or a similar length, the length of one or more of the mechanical fasteners 74 can vary depending upon the shape of the surfaces against which the seal 22 contacts for sealing. Thus, the mechanical fastening arrangement illustrated and described herein is merely exemplary.

The one or frames 76 generally extend along one or both of the first face 70 and the second face 72 within the encasing layer 78. In one example, the seal 22 includes a first frame 76a along the first face 70 and a second frame 76b along the second face 72. The frames 76a, 76b provide a surface for coupling the mechanical fasteners 74 to the seal 22. The frames 76a, 76b can be composed of any suitable material with a high melting point, such as a melting point greater than about 2000 degrees Fahrenheit. In one example, the frames 76a, 76b are composed of a weldable metal or metal alloy such as Inconel™, stainless steel, a cobalt-nickel alloy, or a nickel based alloy having a melting point greater than about 2000 degrees Fahrenheit with little to no oxidation. Thus, in this example, the one or more mechanical fasteners 74 can be welded to a respective one of the frames 76a, 76b, and the encasing layer 78 includes one or more bores through which the one or more mechanical fasteners 74 extend. Generally, the frames 76a, 76b are composed as the same material as the seal body 80, however, the frames 76a, 76b and the seal body 80 can be composed of different materials, if desired. The frames 76a, 76b can have any desired thickness T along the first face 70 and the second face 72, and in one example, the thickness T is generally less than about 0.030 inches (in.). It should be noted that the thickness T illustrated and described herein is merely exemplary, and further, the frame 76a can have a different thickness than the frame 76b, if desired.

Figure 3:
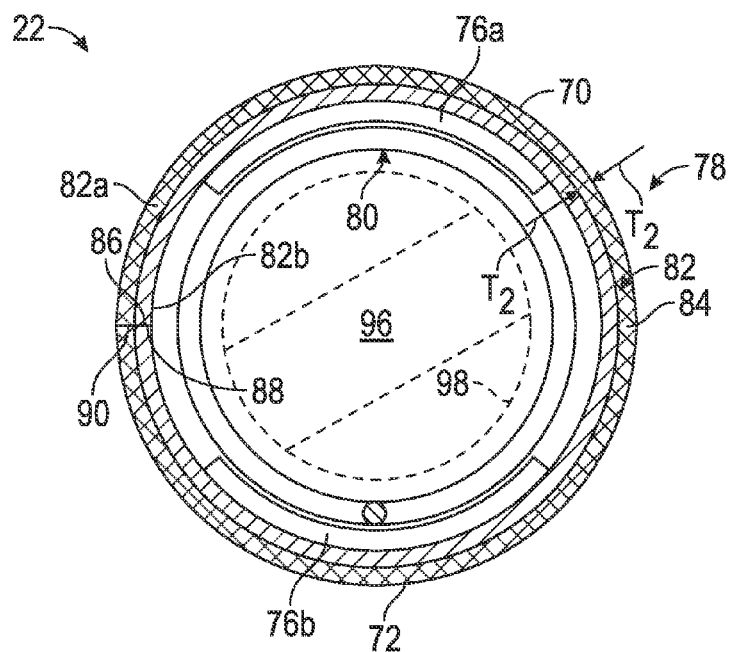
FIG. 3 is a cross-sectional view of the device of FIG. 2, taken along line 3-3 of FIG. 2.

In this example, with reference to FIG. 3, the frames 76a, 76b are generally arcuate, such that the frames 76a, 76b are slightly concave to conform to the seal body 80. It should be noted that the shape of the frames 76a, 76b need not be concave, but that the frames 76a, 76b can have any desired shape to conform to the seal body 80. The frames 76a, 76b also generally include rounded corners such that the frames 76a, 76b do not have sharp edges. The frames 76a, 76b serve to distribute pressure evenly along the seal body 80. In one example, the frames 76a, 76b are each coupled to the seal body 80, on opposing sides of the seal body 80, such that the frame 76a is adjacent to the first face 70 and the frame 76b is adjacent to the second face 72. The frames 76a, 76b can be coupled to opposing sides of the seal body 80 through any suitable technique, such as welding, riveting, etc.

The encasing layer 78 provides a substantially low porosity covering or barrier about the seal body 80. In one example, with reference to FIG. 3, the encasing layer 78 includes a fabric layer 82 and a coating layer 84. Generally, the encasing layer 78 is disposed about the seal body 80 such that the encasing layer 78 substantially entirely encloses the seal body 80 and the frames 76a, 76b to provide a pliable surface for sealing against. It should be noted, however, that the fabric layer 82 and/or the coating layer 84 need not substantially entirely enclose the seal body 80 and the frames 76a, 76b, but one or more of the fabric layer 82 and/or the coating layer 84 can enclose or be disposed about only a portion of the seal body 80, if desired. Generally, the encasing layer 78 includes one or more bores though which the one or more mechanical fasteners 74 extend when the encasing layer 78 is disposed about the frames 76a, 76b and the seal body 80. In one example, the bores can be punched through the encasing layer 78, however, the bores can be formed through any suitable technique.

The fabric layer 82 can be composed of any suitable fiber, such as ceramic, basalt, graphite, glass fiber (E-glass, S-glass, H-glass, R-glass, AR-glass), fiberglass and combinations thereof. In this example, the fabric layer 82 includes a first end 86 and a second end 88. The frames 76a, 76b and the seal body 80 can be inserted between the first end 86 and the second end 88 of the fabric layer 82, and the first end 86 and the second end 88 of the fabric layer 82 can be coupled together to substantially enclose the frames 76a, 76b and the seal body 80. In one example, the first end 86 and the second end 88 are coupled together at a seam 90 via stitching with a suitable thread, such as a ceramic thread 89 (FIG. 2). As the coating layer 84 is disposed on the fabric layer 82, the seam 90 can be defined through both the coating layer 84 and the fabric layer 82. Generally, the seam 90 extends about a perimeter of the seal body 80 to fully enclose the frames 76a, 76b and the seal body 80 (FIG. 2). It should be noted that the use of stitching is merely exemplary, as the first end 86 and the second end 88 can be coupled together via any suitable technique, such as adhesives, rivets, etc. Furthermore, the use of a ceramic thread is merely exemplary, as any suitable material can be employed to secure the first end 86 and second end 88 of the fabric layer 82, such as basalt, graphite, glass fiber, fiberglass, and combinations thereof.

The coating layer 84 can be disposed on the fabric layer 82. Generally, the coating layer 84 is coupled to or disposed on a first or exterior surface 82a of the fabric layer 82, however, the coating layer 84 can be coupled to or disposed on a second or interior surface 82b of the fabric layer 82, if desired. The coating layer 84 provides a generally fluid resistant barrier about the fabric layer 82. In one example, the coating layer 84 is composed of vermiculite, mica, polytetrafluoroethylene (PTFE), silicone or a hydrophobic coating. The coating layer 84 can have any desired thickness, and in one example, can have a thickness T2 of less than about 0.250 inches (in.).

Figure 4:
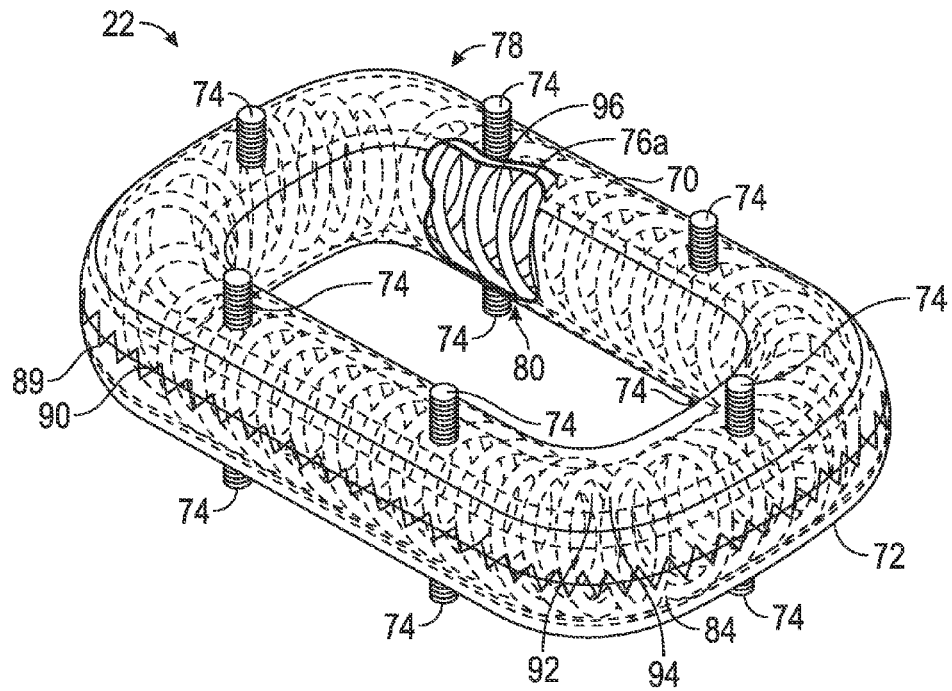
FIG. 4 is a schematic view of the device of FIG. 2, in which a seal body is illustrated.

The seal body 80 is disposed within the encasing layer 78. In one example, the seal body 80 is an energized seal body for sealing against two parts. In this example, with reference to FIG. 4, the seal body 80 comprises a coil spring. The coil spring of the seal body 80 can be composed of any suitable material, such as a metal or metal alloy. In one example, the coil spring of the seal body 80 is composed of a weldable metal or metal alloy such as Inconel™, stainless steel, a cobalt-nickel alloy, or a nickel based alloy having a melting point greater than about 2000 degrees Fahrenheit with little to no oxidation.

The seal body 80 includes a first end 92 and a second end 94. The first end 92 is coupled to the second end 94 to form the seal 22 with a closed perimeter. The first end 92 can be coupled to the second end 94 via welding, for example, but it should be understood that any suitable technique can be used to couple the first end 92 to the second end 94, such as mechanical fasteners. In addition, the seal body 80 can define a cavity 96 (FIG. 3). The cavity 96 can be filled with a material 98, if desired. For example, the material 98 can comprise a ceramic, graphite, basalt, fiberglass and combinations thereof. The filling of the cavity 96 with the material 98 can reduce the permeability of gases through the seal 22.

In order to assemble the seal 22, in one example, the cavity 96 is filled or packed with the material 98, if desired. The first end 92 of the seal body 80 is coupled to the second end 94, via welding, for example. The frames 76a, 76b, with the one or more mechanical fasteners 74 welded thereto, are coupled to the seal body 80 such that the frame 76a is adjacent to the first face 70 and the frame 76b is adjacent to the second face 72. The fabric layer 82, with the coating layer 84 already applied or disposed on the exterior surface 82a, is wrapped around the frames 76a, 76b and the seal body 80, so as to substantially enclose the entire seal body 80. With the frames 76a, 76b and the seal body 80 disposed between the first end 86 and the second end 88 of the fabric layer 82, the first end 86 and the second end 88 of the fabric layer 82 can be sewn together at the seam 90 such that the one or more mechanical fasteners 74 extend through the bores defined through the encasing layer 78.

With the seal 22 assembled, the seal 22 can be coupled to one or more of the flanges 42, 64 (FIG. 1) via the mechanical fasteners 74 and nuts 81 (FIG. 1). The seal 22 provides heat resistance or resistance to flame at about 2000 degrees Fahrenheit for at least about 15 minutes. It should be noted that the use of the seal 22 in the joint 20 between the inlet duct 16 and plenum 18 (FIG. 1) is merely exemplary, as the seal 22 can be used between any two surfaces. Thus, the seal 22 is not limited to the use described in conjunction with FIG. 1. Further, the teachings of the present disclosure are not limited to the seal 22. Rather, any suitable device, such as a gaskets, ducts, hoses, bellows, etc. can be enclosed by the encasing layer 78, which can be coupled about the device (via stitching with a suitable thread, such as the ceramic thread) to improve heat resistance of the device.

Figure 5:
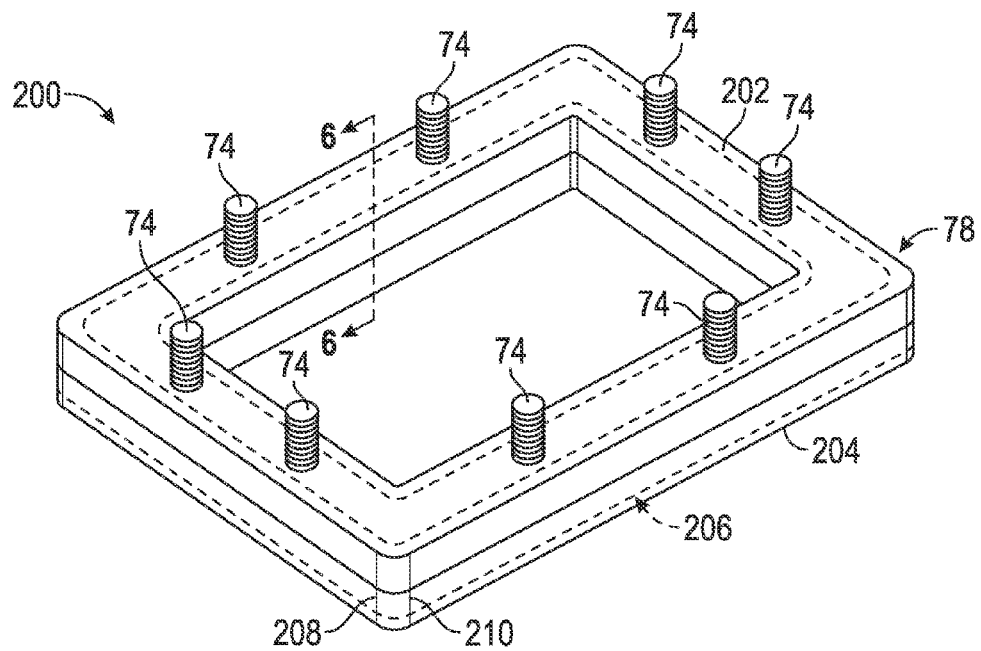
FIG. 5 is a perspective view illustrating a device with improved heat resistance in accordance with various embodiments.

With reference now to FIG. 5, a seal 200 is shown. As the seal 200 can be similar to the seal 22 discussed with regard to FIGS. 1-4, only the differences between the seal 22 and the seal 200 will be discussed in detail herein, with the same reference numerals used to denote the same or substantially similar components.

The seal 200 is shaped and sized to cooperate with the flange 42 of the second end 28 of the inlet duct 16 and the flange 64 of the first end 52 of the plenum 18 (FIG. 1). In one example, the seal 200 includes a first face 202, a second face 204, the one or more mechanical fasteners 74, the encasing layer 78 and a seal body 206. The one or more mechanical fasteners 74 in this example are not coupled to one or more frames 76, but rather, are coupled directly to the seal body 206 via welding, for example. It will be understood that the seal 200 can include one or more frames, similar to the one or more frames 76, if desired. As discussed with regard to the seal 22, the encasing layer 78 includes the fabric layer 82 and the coating layer 84. The fabric layer 82 is composed of any suitable fiber, such as ceramic, basalt, graphite, glass fiber (E-glass, S-glass, H-glass, R-glass, AR-glass), fiberglass and combinations thereof, and the coating layer 84 is composed of vermiculite, mica, polytetrafluoroethylene (PTFE), silicone or a hydrophobic coating. The encasing layer 78 can be coupled about the seal body 206 and sewn together at the seam 90, with a suitable thread, such as the ceramic thread discussed with regard to the seal 22.

The first face 202 is coupled to the flange 42 via the one or more mechanical fasteners 74 and seals against the flange 42 of the inlet duct 16 (FIG. 1). The second face 204 is coupled to the flange 64 via the one or more mechanical fasteners 74 and seals against the flange 64 of the plenum 18 (FIG. 1). In the example illustrated herein, the seal 200 is sized to extend about the perimeter of the flanges 42, 64 and is substantially rectangular, with a curved radius at corners of the seal 200. It should be understood, however, that the size and shape of the seal 200 is merely exemplary. In this regard, the seal 200 can be circular or have any polygonal shape that corresponds to the shape of the surfaces against which the seal 200 contacts for sealing.

Figure 6:
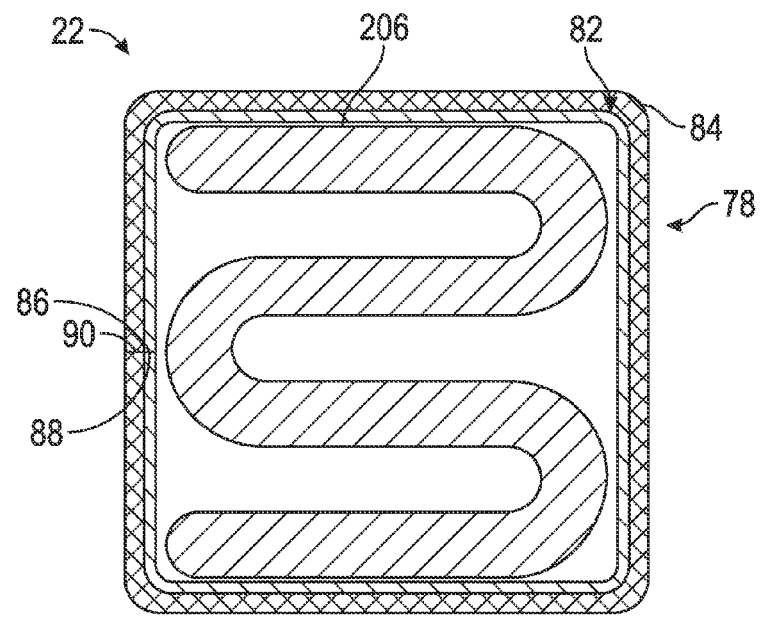
FIG. 6 is a cross-sectional view of the device of FIG. 5, taken along line 6-6 of FIG. 5.

With reference to FIG. 6, the seal body 206 is disposed within the fabric layer 82 and the coating layer 84 of the encasing layer 78. It should be noted that while the encasing layer 78 is illustrated as enclosing the seal body 206 with a generally rectangular shape, the encasing layer 78 could be formed to correspond to the shape of the seal body 206, and thus, the size and shape of the encasing layer 78 in FIG. 6 is merely exemplary. In one example, the seal body 206 is an energized seal body for sealing against two parts. In this example, the seal body 206 comprises a generally sigma (Σ) shaped body that includes rounded corners. The seal body 206 can be composed of any suitable material, such as a metal or metal alloy. In one example, the seal body 206 is composed of a weldable metal or metal alloy such as Inconel™, stainless steel, a cobalt-nickel alloy, or a nickel based alloy having a melting point greater than about 2000 degrees Fahrenheit with little to no oxidation.

The seal body 206 includes a first end 208 and a second end 210. The first end 208 can be coupled to the second end 210 via welding for example, but it should be understood that any suitable technique can be used to couple the first end 208 to the second end 210, such as mechanical fasteners. Furthermore, the seal body 206 can be composed of a plurality of body segments, each having a first end and a second end, which can be coupled together to define the shape of the seal 200.

As the seal 200 can be assembled in a manner similar to that described above in connection with the seal 22, the assembly of the seal 200 will not be discussed in great detail herein. In addition, it should be noted that the use of the seal 200 in the joint 20 between the inlet duct 16 and plenum 18 (FIG. 1) is merely exemplary, as the seal 200 can be used between any two surfaces. Thus, the seal 200 is not limited to the use described in conjunction with FIG. 1.

Figure 7:
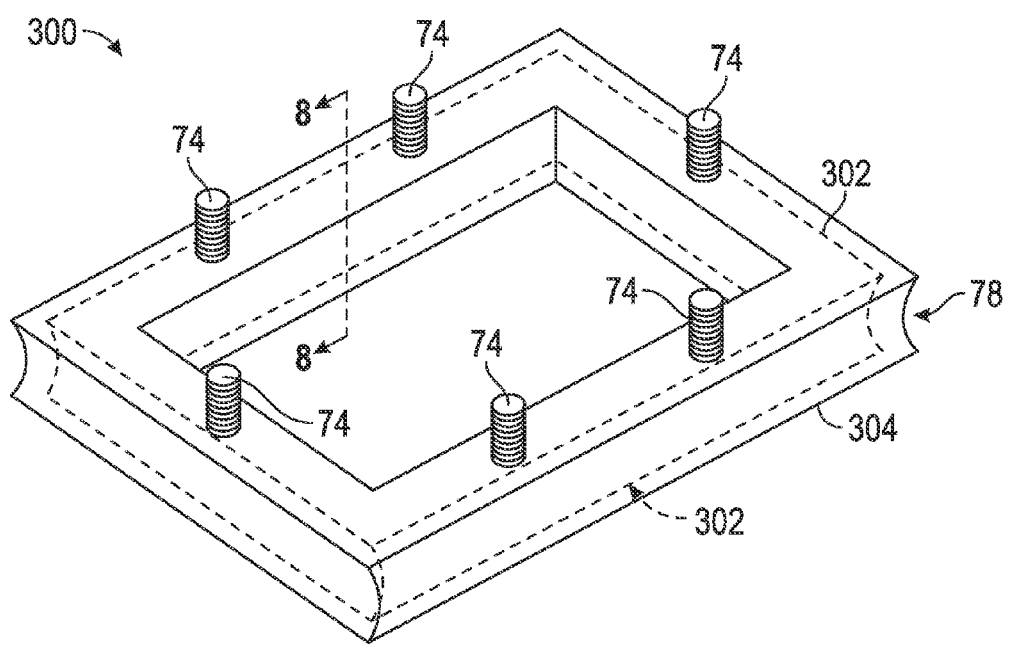
FIG. 7 is a perspective view illustrating a device with improved heat resistance in accordance with various embodiments.

With reference now to FIG. 7, a seal 300 is shown. As the seal 300 can be similar to the seal 22 discussed with regard to FIGS. 1-4, only the differences between the seal 22 and the seal 300 will be discussed in detail herein, with the same reference numerals used to denote the same or substantially similar components.

The seal 300 is shaped and sized to cooperate with the flange 42 of the second end 28 of the inlet duct 16 and the flange 64 of the first end 52 of the plenum 18 (FIG. 1). In one example, the seal 300 includes a first face 302, a second face 304, the one or more mechanical fasteners 74, the encasing layer 78 and a seal body 306. The one or more mechanical fasteners 74 in this example are not coupled to one or more frames 76, but rather, are coupled directly to the seal body 306 via welding, for example. It will be understood, however, that the seal 300 can include one or more frames, similar to the one or more frames 76, if desired. As discussed with regard to the seal 22, the encasing layer 78 includes the fabric layer 82 and the coating layer 84. The fabric layer 82 is composed of any suitable fiber, such as ceramic, basalt, graphite, glass fiber (E-glass, S-glass, H-glass, R-glass, AR-glass), fiberglass and combinations thereof, and the coating layer 84 is composed of vermiculite, mica, polytetrafluoroethylene (PTFE), silicone or a hydrophobic coating. The encasing layer 78 can be coupled about the seal body 306 and sewn together at the seam 90, with a suitable thread, such as the ceramic thread discussed with regard to the seal 22.

The first face 302 is coupled to the flange 42 via the one or more mechanical fasteners 74 and seals against the flange 42 of the inlet duct 16 (FIG. 1). The second face 304 is coupled to the flange 64 via the one or more mechanical fasteners 74 and seals against the flange 64 of the plenum 18 (FIG. 1). In the example illustrated herein, the seal 300 is sized to extend about the perimeter of the flanges 42, 64 and is substantially rectangular, with a curved radius at corners of the seal 300. It should be understood, however, that the size and shape of the seal 300 is merely exemplary. In this regard, the seal 300 can be circular or have any polygonal shape that corresponds to the shape of the surfaces against which the seal 300 contacts for sealing.

Figure 8:
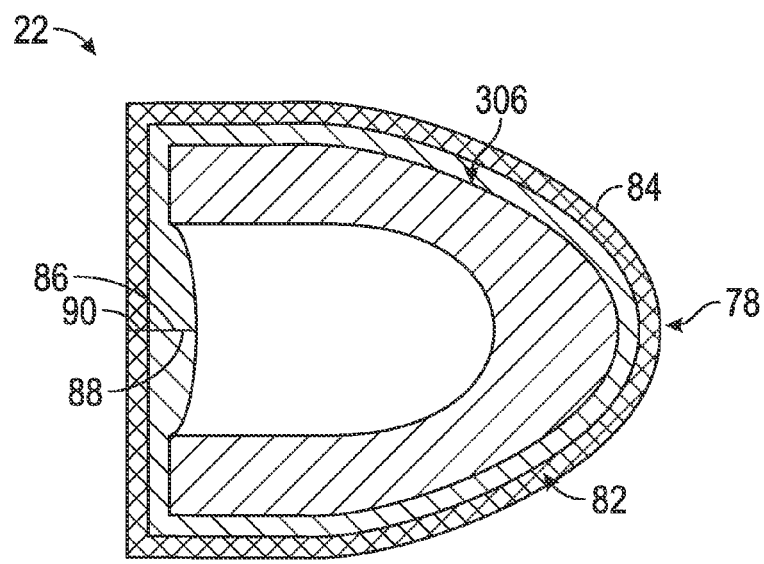
FIG. 8 is a cross-sectional view of the device of FIG. 7, taken along line 8-8 of FIG. 7.

With reference to FIG. 8, the seal body 306 is disposed within the fabric layer 82 and the coating layer 84 of the encasing layer 78. It should be noted that while the encasing layer 78 is illustrated as enclosing the seal body 306 with a generally C-shape, the encasing layer 78 could be formed to correspond to the shape of the seal body 306 (e.g. the encasing layer 78 can be C-shaped), and thus, the size and shape of the encasing layer 78 in FIG. 8 is merely exemplary. In one example, the seal body 306 is an energized seal body for sealing against two parts. In this example, the seal body 306 comprises a generally C-shaped body that includes rounded corners. The seal body 306 can be composed of any suitable material, such as a metal or metal alloy. In one example, the seal body 306 is composed of a weldable metal or metal alloy such as Inconel™, stainless steel, a cobalt-nickel alloy, or a nickel based alloy having a melting point greater than about 2000 degrees Fahrenheit with little to no oxidation.

The seal body 306 includes a first end and a second end. The first end can be coupled to the second end via welding for example to form the rectangular shape of the seal 300, but it should be understood that any suitable technique can be used to couple the first end to the second end, such as mechanical fasteners. Furthermore, the seal body 306 can be composed of a plurality of body segments, each having a first end and a second end, which can be coupled together to define the shape of the seal 300.

As the seal 300 can be assembled in a manner similar to that described above in connection with the seal 22, the assembly of the seal 300 will not be discussed in great detail herein. In addition, it should be noted that the use of the seal 300 in the joint 20 between the inlet duct 16 and plenum 18 (FIG. 1) is merely exemplary, as the seal 300 can be used between any two surfaces. Thus, the seal 300 is not limited to the use described in conjunction with FIG. 1.

Figure 9:
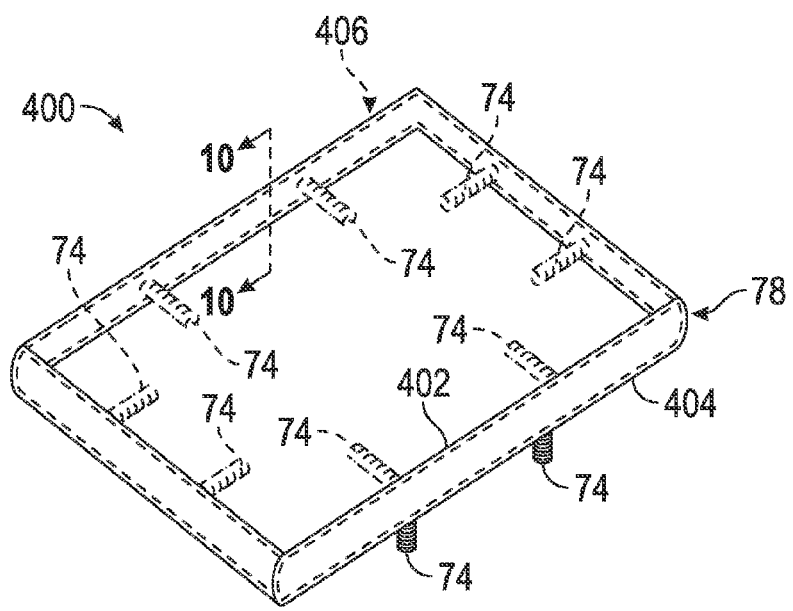
FIG. 9 is a perspective view illustrating a device with improved heat resistance in accordance with various embodiments.

With reference now to FIG. 9, a seal 400 is shown. As the seal 400 can be similar to the seal 22 discussed with regard to FIGS. 1-4, only the differences between the seal 22 and the seal 400 will be discussed in detail herein, with the same reference numerals used to denote the same or substantially similar components.

The seal 400 includes a first face 402, a second face 404, the one or more mechanical fasteners 74, the encasing layer 78 and a seal body 406. The one or more mechanical fasteners 74 in this example are not coupled to one or more frames 76, but rather, are coupled directly to the seal body 406 via welding, for example. It will be understood that the seal 400 can include one or more frames, similar to the one or more frames 76, if desired. In addition, while the seal 400 is illustrated herein as including one or more mechanical fasteners 74 along an inner perimeter of the seal 400, it should be understood that these mechanical fasteners 74 are optional.

As discussed with regard to the seal 22, the encasing layer 78 includes the fabric layer 82 and the coating layer 84. The fabric layer 82 is composed of any suitable fiber, such as ceramic, basalt, graphite, glass fiber (E-glass, S-glass, H-glass, R-glass, AR-glass), fiberglass and combinations thereof, and the coating layer 84 is composed of vermiculite, mica, polytetrafluoroethylene (PTFE), silicone or a hydrophobic coating. The encasing layer 78 can be coupled about the seal body 406 and sewn together at the seam 90, with a suitable thread, such as the ceramic thread discussed with regard to the seal 22.

The first face 402 is coupled to a first component via the one or more mechanical fasteners 74 and seals against a surface of the first component. The second face 404 is coupled to a second component via the one or more mechanical fasteners 74 and seals against a surface of the second component. In the example illustrated herein, the seal 400 is sized to extend about a rectangular opening, and thus, the seal 400 is substantially rectangular and includes a curved radius at corners of the seal 400. It should be understood, however, that the size and shape of the seal 400 is merely exemplary. In this regard, the seal 400 can be circular or have any polygonal shape that corresponds to the shape of the surfaces against which the seal 400 contacts for sealing.

Figure 10:
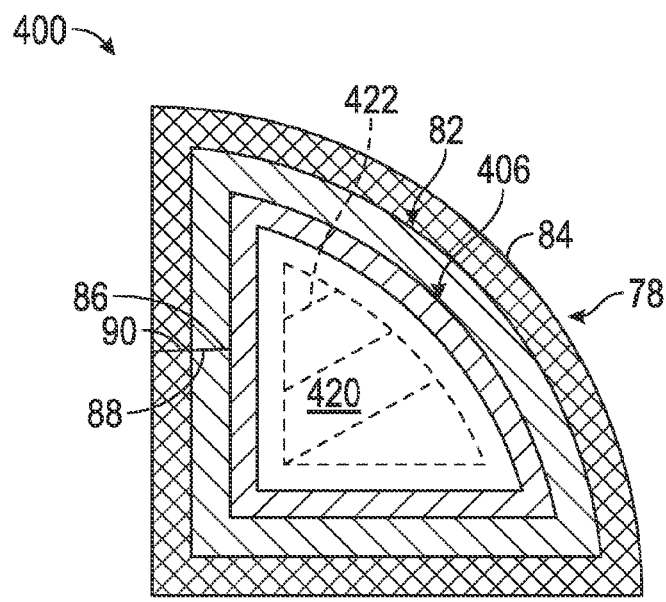
FIG. 10 is a cross-sectional view of the device of FIG. 9, taken along line 10-10 of FIG. 9.

With reference to FIG. 10, the seal body 406 is disposed within the fabric layer 82 and the coating layer 84 of the encasing layer 78. It should be noted that while the encasing layer 78 is illustrated as enclosing the seal body 406 with a generally D-shape, the encasing layer 78 can have any desired shape. In one example, the seal body 406 is an energized seal body for sealing against two parts. In this example, the seal body 406 comprises a generally D-shaped body that includes rounded corners. The seal body 406 can be composed of any suitable material, such as a metal or metal alloy. In one example, the seal body 406 is composed of a weldable metal or metal alloy such as Inconel™, stainless steel, a cobalt-nickel alloy, or a nickel based alloy having a melting point greater than about 2000 degrees Fahrenheit with little to no oxidation.

The seal body 406 includes a first end and a second end. The first end can be coupled to the second end via welding for example to form the rectangular shape of the seal 400, but it should be understood that any suitable technique can be used to couple the first end to the second end, such as mechanical fasteners. Furthermore, the seal body 406 can be composed of a plurality of body segments, each having a first end and a second end, which can be coupled together to define the shape of the seal 400. In addition, the seal body 406 can define a cavity 420 (FIG. 10). The cavity 420 can be filled with a material 422, if desired. For example, the material 422 can comprise a ceramic, graphite, basalt, fiberglass and combinations thereof. The filling of the cavity 420 with the material 422 can reduce the permeability of gases through the seal 400.

As the seal 400 can be assembled in a manner similar to that described above in connection with the seal 22, the assembly of the seal 400 will not be discussed in great detail herein. In addition, it should be noted that the seal 400 can be used between any two surfaces, including the surfaces illustrated in conjunction with FIG. 1.

Figure 11:
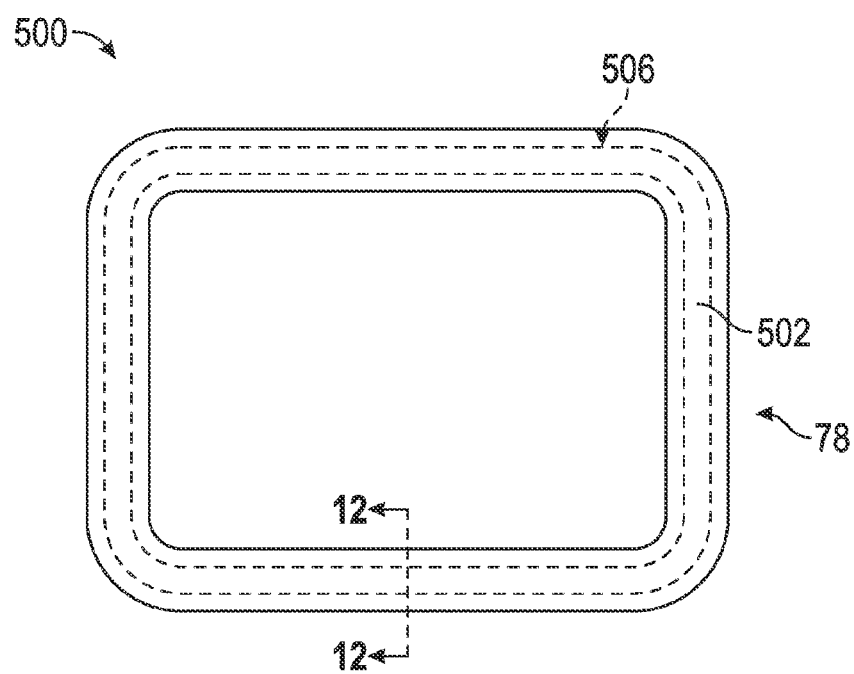
FIG. 11 is a top view illustrating a device with improved heat resistance in accordance with various embodiments.

With reference now to FIG. 11, a seal 500 is shown. As the seal 500 can be similar to the seal 22 discussed with regard to FIGS. 1-4, only the differences between the seal 22 and the seal 500 will be discussed in detail herein, with the same reference numerals used to denote the same or substantially similar components.

The seal 500 includes a first face 502, a second face 504 (FIG. 12), the one or more mechanical fasteners 74 (FIG. 12), the encasing layer 78 and a seal body 506. The one or more mechanical fasteners 74 in this example are not coupled to one or more frames 76, but rather, the one or more fasteners 74 are coupled to the seal body 506 via welding, for example. It will be understood that the seal 500 can include one or more frames, similar to the one or more frames 76, if desired. As discussed with regard to the seal 22, the encasing layer 78 includes the fabric layer 82 and the coating layer 84. The fabric layer 82 is composed of any suitable fiber, such as ceramic, basalt, graphite, glass fiber (E-glass, S-glass, H-glass, R-glass, AR-glass), fiberglass and combinations thereof, and the coating layer 84 is composed of vermiculite, mica, polytetrafluoroethylene (PTFE), silicone or a hydrophobic coating. The encasing layer 78 can be coupled about the seal body 506 and sewn together at the seam 90, with a suitable thread, such as the ceramic thread discussed with regard to the seal 22.

Figure 12:
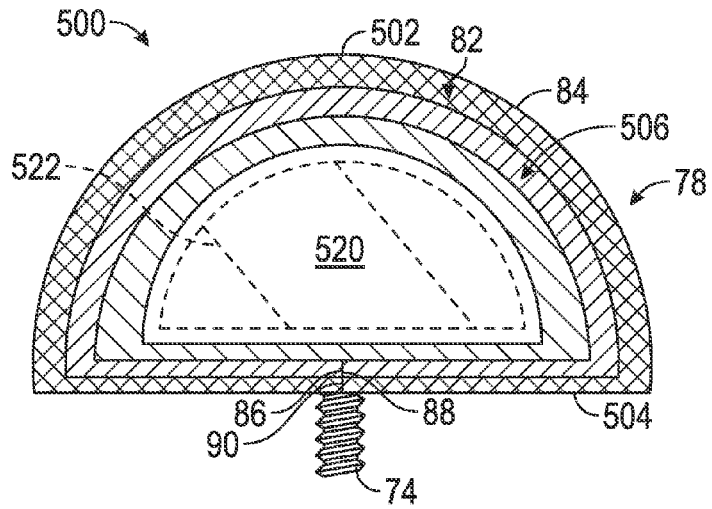
FIG. 12 is a cross-sectional view of the device of FIG. 11, taken along line 12-12 of FIG. 11.

The first face 502 seals against a surface of the first component, such as a portion of the flange 42 of the inlet duct 16 (FIG. 1). With reference to FIG. 12, the second face 504 is coupled to a second component via the one or more mechanical fasteners 74 and seals against a surface of the second component, such as the flange 64 of the plenum 18 (FIG. 1). In the example illustrated herein, the seal 500 is sized to extend about the perimeter of the flanges 42, 64 and is substantially rectangular, with a curved radius at corners of the seal 500. It should be understood, however, that the size and shape of the seal 500 is merely exemplary. In this regard, the seal 500 can be circular or have any polygonal shape that corresponds to the shape of the surfaces against which the seal 500 contacts for sealing.

With reference to FIG. 12, the seal body 506 is disposed within the fabric layer 82 and the coating layer 84 of the encasing layer 78. It should be noted that while the encasing layer 78 is illustrated as enclosing the seal body 506 with a generally semi-circular shape, the encasing layer 78 can have any desired shape. In one example, the seal body 506 is an energized seal body for sealing against two parts. In this example, the seal body 506 comprises a generally semi-circular shaped body that includes rounded corners. The seal body 506 can be composed of any suitable material, such as a metal or metal alloy. In one example, the seal body 506 is composed of a weldable metal or metal alloy such as Inconel™, stainless steel, a cobalt-nickel alloy, or a nickel based alloy having a melting point greater than about 2000 degrees Fahrenheit with little to no oxidation.

The seal body 506 includes a first end and a second end. The first end can be coupled to the second end via welding for example to form the rectangular shape of the seal 500, but it should be understood that any suitable technique can be used to couple the first end to the second end, such as mechanical fasteners. Furthermore, the seal body 506 can be composed of a plurality of body segments, each having the first end and the second end, which can be coupled together to define the shape of the seal 500. In addition, the seal body 506 can define a cavity 520 (FIG. 12). The cavity 520 can be filled with a material 522, if desired. For example, the material 522 can comprise a ceramic, graphite, basalt, fiberglass and combinations thereof.

As the seal 500 can be assembled in a manner similar to that described above in connection with the seal 22, the assembly of the seal 500 will not be discussed in great detail herein. In addition, it should be noted that the use of the seal 500 in the joint 20 between the inlet duct 16 and plenum 18 (FIG. 1) is merely exemplary, as the seal 500 can be used between any two surfaces. Thus, the seal 500 is not limited to the use described in conjunction with FIG. 1.

Figure 13:
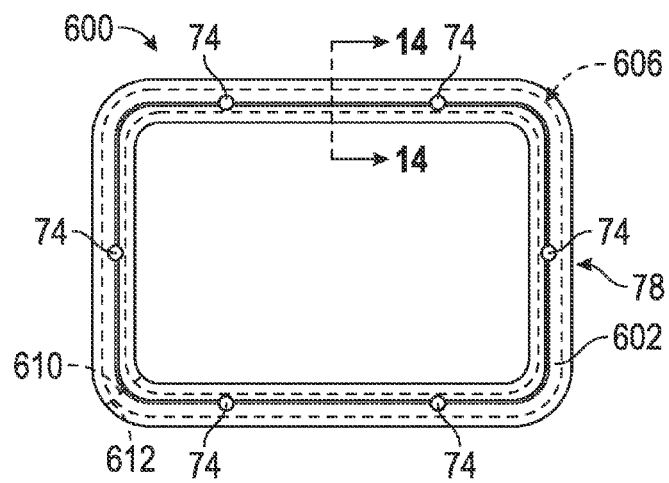
FIG. 13 is a top view illustrating a device with improved heat resistance in accordance with various embodiments.

With reference now to FIG. 13, a seal 600 is shown. As the seal 600 can be similar to the seal 22 discussed with regard to FIGS. 1-4, only the differences between the seal 22 and the seal 600 will be discussed in detail herein, with the same reference numerals used to denote the same or substantially similar components.

The seal 600 includes a first face 602, a second face 604 (FIG. 14), the one or more mechanical fasteners 74, the encasing layer 78 and a seal body 606. The one or more mechanical fasteners 74 in this example are not coupled to one or more frames 76, but rather, are coupled to the seal body 606 via welding, for example. It will be understood that the seal 600 can include one or more frames, similar to the one or more frames 76, if desired.

As discussed with regard to the seal 22, the encasing layer 78 includes the fabric layer 82 and the coating layer 84. The fabric layer 82 is composed of any suitable fiber, such as ceramic, basalt, graphite, glass fiber (E-glass, S-glass, H-glass, R-glass, AR-glass), fiberglass and combinations thereof, and the coating layer 84 is composed of vermiculite, mica, polytetrafluoroethylene (PTFE), silicone or a hydrophobic coating. The encasing layer 78 can be coupled about the seal body 606 and sewn together at the seam 90, with a suitable thread, such as the ceramic thread discussed with regard to the seal 22.

Figure 14:
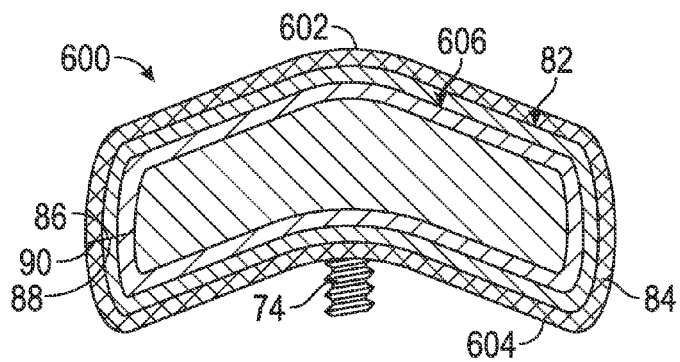
FIG. 14 is a cross-sectional view of the device of FIG. 13, taken along line 14-14 of FIG. 13.

The first face 602 seals against a surface of the first component, such as a portion of the flange 42 of the inlet duct 16 (FIG. 1). With reference to FIG. 14, the second face 604 is coupled to a second component via the one or more mechanical fasteners 74 and seals against a surface of the second component, such as the flange 64 of the plenum 18 (FIG. 1). In the example illustrated herein, the seal 600 is sized to extend about the perimeter of the flanges 42, 64 and is substantially rectangular, with a curved radius at corners of the seal 600. It should be understood, however, that the size and shape of the seal 600 is merely exemplary. In this regard, the seal 600 can be circular or have any polygonal shape that corresponds to the shape of the surfaces against which the seal 600 contacts for sealing.

With continued reference to FIG. 14, the seal body 606 is disposed within the fabric layer 82 and the coating layer 84 of the encasing layer 78. It should be noted that while the encasing layer 78 is illustrated as enclosing the seal body 606 with a shape that corresponds to the shape of the seal body 606, the encasing layer 78 can have any desired shape. In one example, the seal body 606 is an energized seal body for sealing against two parts. In this example, the seal body 606 comprises a generally caret shaped body that includes rounded corners. The seal body 606 can be composed of any suitable material, such as a metal or metal alloy. In one example, the seal body 606 is composed of a weldable metal or metal alloy such as Inconel™, stainless steel, a cobalt-nickel alloy, or a nickel based alloy having a melting point greater than about 2000 degrees Fahrenheit with little to no oxidation.

With reference to FIG. 13, the seal body 606 includes a first end 610 and a second end 612. The first end 610 can be coupled to the second end 612 via welding, for example, to form the rectangular shape of the seal 600, but it should be understood that any suitable technique can be used to couple the first end to the second end, such as mechanical fasteners. Furthermore, the seal body 606 can be composed of a plurality of body segments, each having the first end 610 and the second end 612, which can be coupled together to define the shape of the seal 600.

As the seal 600 can be assembled in a manner similar to that described above in connection with the seal 22, the assembly of the seal 600 will not be discussed in great detail herein. In addition, it should be noted that the use of the seal 600 in the joint 20 between the inlet duct 16 and plenum 18 (FIG. 1) is merely exemplary, as the seal 600 can be used between any two surfaces. Thus, the seal 600 is not limited to the use described in conjunction with FIG. 1.

Figure 15:
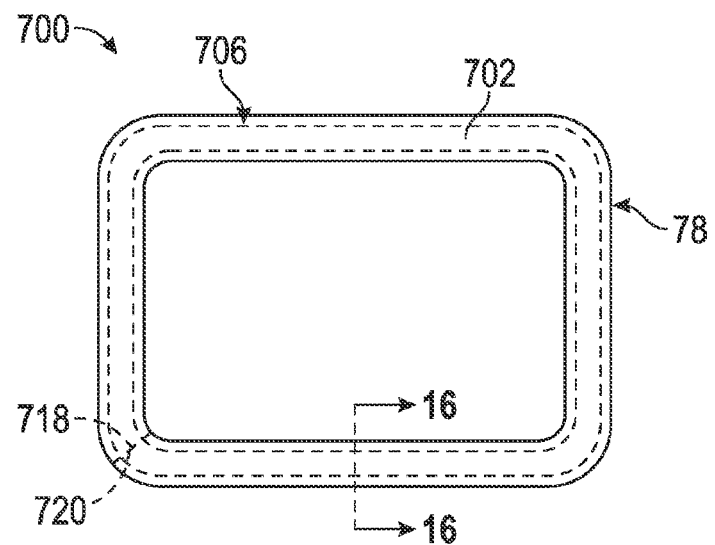
FIG. 15 is a top view illustrating a device with improved heat resistance in accordance with various embodiments.

With reference now to FIG. 15, a seal 700 is shown. As the seal 700 can be similar to the seal 22 discussed with regard to FIGS. 1-4, only the differences between the seal 22 and the seal 700 will be discussed in detail herein, with the same reference numerals used to denote the same or substantially similar components.

The seal 700 includes a first face 702, a second face 704 (FIG. 16), the one or more mechanical fasteners 74, the encasing layer 78 and a seal body 706. The one or more mechanical fasteners 74 in this example are not coupled to one or more frames 76, but rather, are coupled to the seal body 706, via welding for example. It will be understood that the seal 700 can include one or more frames, similar to the one or more frames 76, if desired. As discussed with regard to the seal 22, the encasing layer 78 includes the fabric layer 82 and the coating layer 84. The fabric layer 82 is composed of any suitable fiber, such as ceramic, basalt, graphite, glass fiber (E-glass, S-glass, H-glass, R-glass, AR-glass), fiberglass and combinations thereof, and the coating layer 84 is composed of vermiculite, mica, polytetrafluoroethylene (PTFE), silicone or a hydrophobic coating. The encasing layer 78 can be coupled about the seal body 706 and sewn together at the seam 90, with a suitable thread, such as the ceramic thread discussed with regard to the seal 22.

Figure 16:
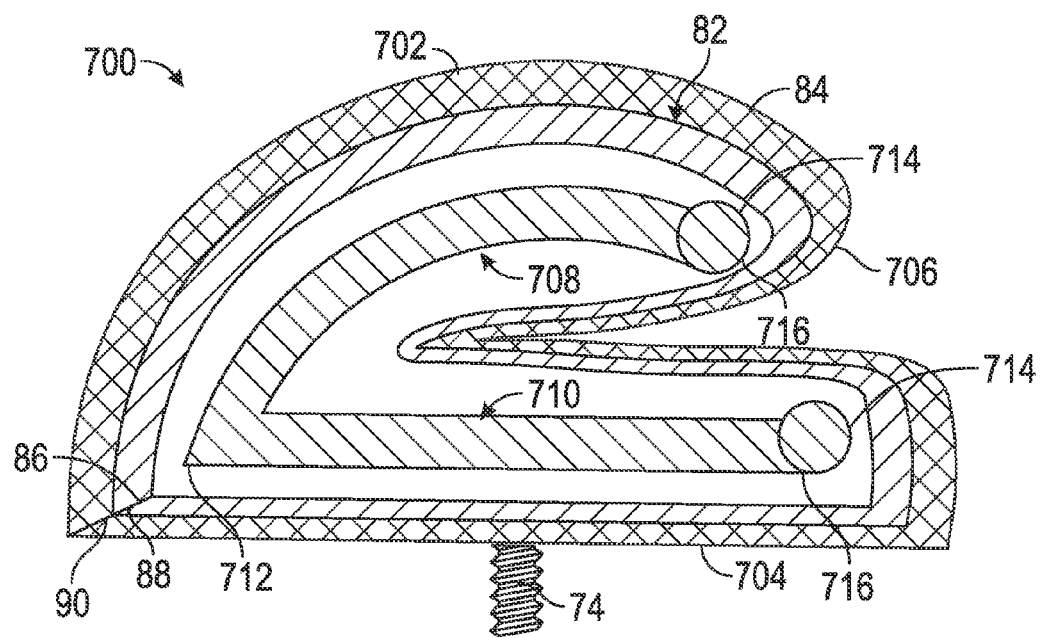
FIG. 16 is a cross-sectional view of the device of FIG. 15, taken along line 16-16 of FIG. 15.

The first face 702 seals against a surface of a first component. With reference to FIG. 16, the second face 704 is coupled to a second component via the one or more mechanical fasteners 74 and seals against a surface of the second component. In the example illustrated in FIG. 15, the seal 700 is sized to extend about a rectangular opening, and thus, the seal 700 is substantially rectangular and includes a curved radius at corners of the seal 700. It should be understood, however, that the size and shape of the seal 700 is merely exemplary. In this regard, the seal 700 can be circular or have any polygonal shape that corresponds to the shape of the surfaces against which the seal 700 contacts for sealing.

With reference to FIG. 16, the seal body 706 is disposed within the fabric layer 82 and the coating layer 84 of the encasing layer 78. It should be noted that while the encasing layer 78 is illustrated as enclosing the seal body 706 with a semi-circular shape, the encasing layer 78 can have any desired shape. The encasing layer 78 can also be pliable or flexible to enable the encasing layer 78 to conform against the seal body 706 and the surfaces against which the seal body 706 contacts for sealing. In one example, the seal body 706 is an energized seal body for sealing against two parts. In this example, the seal body 706 comprises a generally V-shaped body. The seal body 706 includes a first arm 708 and a second arm 710, which are coupled together at a rounded corner 712. Each of the first arm 708 and the second arm 710 include a grip surface 714 at a terminal end 716. The grip surface 714 can couple or hold the seal 700 to the first component. The seal body 706 can be composed of any suitable material, such as a metal or metal alloy. In one example, the seal body 706 is composed of a weldable metal or metal alloy such as Inconel™, stainless steel, a cobalt-nickel alloy, or a nickel based alloy having a melting point greater than about 2000 degrees Fahrenheit with little to no oxidation.

With reference to FIG. 15, the seal body 706 also includes a first end 718 and a second end 720. The first end 718 can be coupled to the second end 720 via welding, for example, to form the rectangular shape of the seal 700, but it should be understood that any suitable technique can be used to couple the first end 718 to the second end 720, such as mechanical fasteners. Furthermore, the seal body 706 can be composed of a plurality of body segments, each having the first end 718 and the second end 720, which can be coupled together to define the shape of the seal 700.

As the seal 700 can be assembled in a manner similar to that described above in connection with the seal 22, the assembly of the seal 700 will not be discussed in great detail herein. In addition, it should be noted that the seal 700 can be used between any two surfaces, including the surfaces illustrated in conjunction with FIG. 1.

Figure 17:
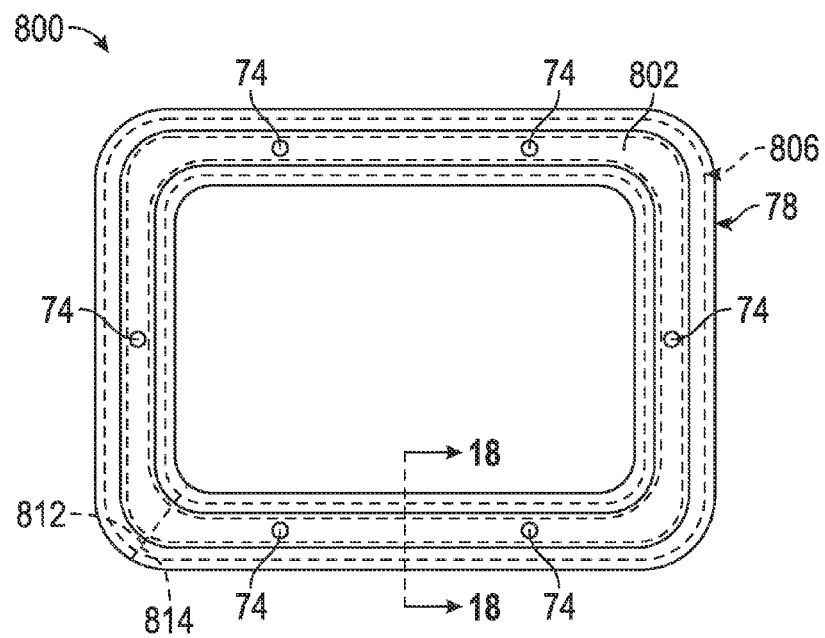
FIG. 17 is a top view illustrating a device with improved heat resistance in accordance with various embodiments.

With reference now to FIG. 17, a seal 800 is shown. As the seal 800 can be similar to the seal 22 discussed with regard to FIGS. 1-4, only the differences between the seal 22 and the seal 800 will be discussed in detail herein, with the same reference numerals used to denote the same or substantially similar components.

The seal 800 includes a first face 802, a second face 804 (FIG. 18), the one or more mechanical fasteners 74, the encasing layer 78 and a seal body 806. The one or more mechanical fasteners 74 in this example are not coupled to one or more frames 76, but rather, the one or more mechanical fasteners 74 are coupled to the seal body 806 via welding, for example. It will be understood that the seal 800 can include one or more frames, similar to the one or more frames 76, if desired.

As discussed with regard to the seal 22, the encasing layer 78 includes the fabric layer 82 and the coating layer 84. The fabric layer 82 is composed of any suitable fiber, such as ceramic, basalt, graphite, glass fiber (E-glass, S-glass, H-glass, R-glass, AR-glass), fiberglass and combinations thereof, and the coating layer 84 is composed of vermiculite, mica, polytetrafluoroethylene (PTFE), silicone or a hydrophobic coating. The encasing layer 78 can be coupled about the seal body 806 and sewn together at the seam 90, with a suitable thread, such as the ceramic thread discussed with regard to the seal 22.

Figure 18:
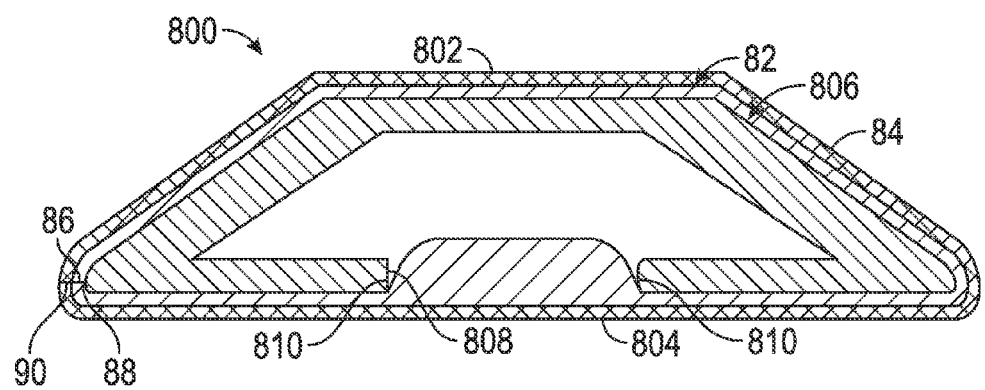
FIG. 18 is a cross-sectional view of the device of FIG. 17, taken along line 18-18 of FIG. 17.

The first face 802 is coupled to a first component via the one or more mechanical fasteners 74 and seals against a surface of the first component. With reference to FIG. 18, the second face 804 seals against a surface of a second component. In the example illustrated in FIG. 17, the seal 800 is sized to extend about a rectangular opening, and thus, the seal 800 is substantially rectangular and includes a curved radius at corners of the seal 800. It should be understood, however, that the size and shape of the seal 800 is merely exemplary. In this regard, the seal 800 can be circular or have any polygonal shape that corresponds to the shape of the surfaces against which the seal 800 contacts for sealing.

With reference to FIG. 18, the seal body 806 is disposed within the fabric layer 82 and the coating layer 84 of the encasing layer 78. It should be noted that while the encasing layer 78 is illustrated as enclosing the seal body 806 with a semi-circular shape, the encasing layer 78 can have any desired shape. The encasing layer 78 can also be pliable or flexible to enable the encasing layer 78 to conform against the seal body 806 and the surfaces against which the seal body 806 contacts for sealing.

In one example, the seal body 806 is an energized seal body for sealing against two parts. In this example, the seal body 806 comprises a generally trapezoidal body, and defines an aperture 808 between terminal ends 810. The seal body 806 can be composed of any suitable material, such as a metal or metal alloy. In one example, the seal body 806 is composed of a weldable metal or metal alloy such as Inconel™, stainless steel, a cobalt-nickel alloy, or a nickel based alloy having a melting point greater than about 2000 degrees Fahrenheit with little to no oxidation.

With reference to FIG. 17, the seal body 806 also includes a first end 812 and a second end 814. The first end 812 can be coupled to the second end 814 via welding, for example, to form the rectangular shape of the seal 800, but it should be understood that any suitable technique can be used to couple the first end 812 to the second end 814, such as mechanical fasteners. Furthermore, the seal body 806 can be composed of a plurality of body segments, each having the first end 812 and the second end 814, which can be coupled together to define the shape of the seal 800.

As the seal 800 can be assembled in a manner similar to that described above in connection with the seal 22, the assembly of the seal 800 will not be discussed in great detail herein. In addition, it should be noted that the seal 800 can be used between any two surfaces, including the surfaces illustrated in conjunction with FIG. 1.

Figure 19:
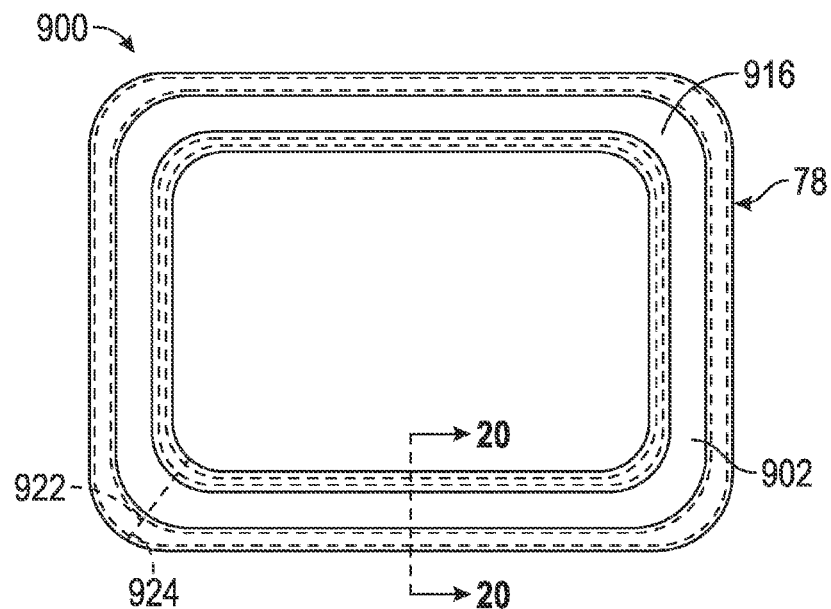
FIG. 19 is a top view illustrating a device with improved heat resistance in accordance with various embodiments.

With reference now to FIG. 19, a seal 900 is shown. As the seal 900 can be similar to the seal 22 discussed with regard to FIGS. 1-4, only the differences between the seal 22 and the seal 900 will be discussed in detail herein, with the same reference numerals used to denote the same or substantially similar components.

The seal 900 includes a first face 902, a second face 904 (FIG. 20), the encasing layer 78 and a seal body 906. As discussed with regard to the seal 22, the encasing layer 78 includes the fabric layer 82 and the coating layer 84. The fabric layer 82 is composed of any suitable fiber, such as ceramic, basalt, graphite, glass fiber (E-glass, S-glass, H-glass, R-glass, AR-glass), fiberglass and combinations thereof, and the coating layer 84 is composed of vermiculite, mica, polytetrafluoroethylene (PTFE), silicone or a hydrophobic coating. The encasing layer 78 can be coupled about the seal body 906 and sewn together at the seam 90, with a suitable thread, such as the ceramic thread discussed with regard to the seal 22.

Figure 20:
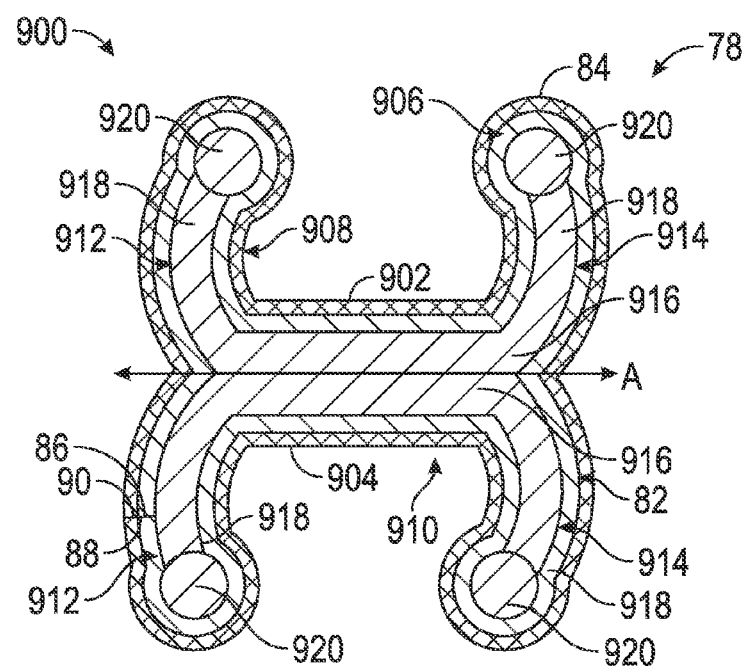
FIG. 20 is a cross-sectional view of the device of FIG. 19, taken along line 20-20 of FIG. 19.

The first face 902 is coupled to a first component and seals against a surface of the first component. With reference to FIG. 20, the second face 904 is coupled to a second component and seals against a surface of the second component. In the example illustrated in FIG. 19, the seal 900 is sized to extend about a rectangular opening, and thus, the seal 900 is substantially rectangular and includes a curved radius at corners of the seal 900. It should be understood, however, that the size and shape of the seal 900 is merely exemplary. In this regard, the seal 900 can be circular or have any polygonal shape that corresponds to the shape of the surfaces against which the seal 900 contacts for sealing.

With reference to FIG. 20, the seal body 906 is disposed within the fabric layer 82 and the coating layer 84 of the encasing layer 78. It should be noted that while the encasing layer 78 is illustrated as enclosing the seal body 906 with a shape that substantially corresponds to the seal body 906, the encasing layer 78 can have any desired shape. In one example, the seal body 906 is an energized seal body for sealing against two parts. The seal body 906 can be composed of any suitable material, such as a metal or metal alloy. In one example, the seal body 906 is composed of a weldable metal or metal alloy such as Inconel™, stainless steel, a cobalt-nickel alloy, or a nickel based alloy having a melting point greater than about 2000 degrees Fahrenheit with little to no oxidation.

In this example, the seal body 906 comprises a generally H-shaped body. In this regard, the seal body 906 includes a first substantially U-shaped portion 908 and a second substantially U-shaped portion 910. Each of the first portion 908 and the second portion 910 include a first arm 912, a second arm 914 and a base 916. The first arm 912 and the second arm 914 are each coupled to the base 916, and a terminal end 918 of each of the first arm 912 and the second arm 914 includes a grip surface 920. The grip surface 920 can couple or hold the respective one of the first portion 908 and the second portion 910 to the respective one of the first component and the second component to couple the seal 900 to the first component and the second component. Generally, the first portion 908 is coupled to the second portion 910 at the base 916 such that the first portion 908 is symmetric to the second portion 910 along an axis A defined through the base 916.

With reference to FIG. 19, the seal body 906 also includes a first end 922 and a second end 924. The first end 922 can be coupled to the second end 924 via welding, for example, to form the rectangular shape of the seal 900, but it should be understood that any suitable technique can be used to couple the first end 922 to the second end 924, such as mechanical fasteners. Furthermore, the seal body 906 can be composed of a plurality of body segments, each having the first end 922 and the second end 924, which can be coupled together to define the shape of the seal 900.

As the seal 900 can be assembled in a manner similar to that described above in connection with the seal 22, the assembly of the seal 900 will not be discussed in great detail herein. In addition, it should be noted that the seal 900 can be used between any two surfaces, including the surfaces illustrated in conjunction with FIG. 1.

Figure 21:
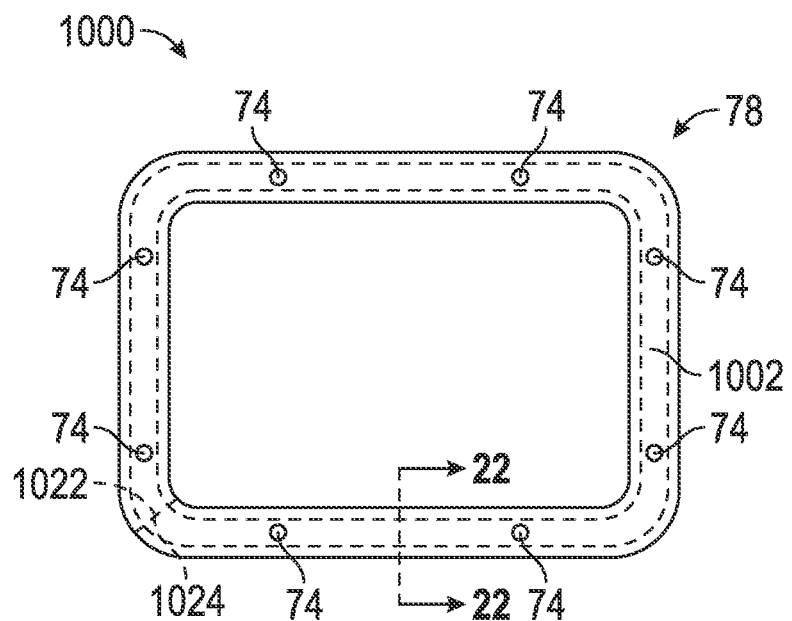
FIG. 21 is a top view illustrating a device with improved heat resistance in accordance with various embodiments.

With reference now to FIG. 21, a seal 1000 is shown. As the seal 1000 can be similar to the seal 22 discussed with regard to FIGS. 1-4, only the differences between the seal 22 and the seal 1000 will be discussed in detail herein, with the same reference numerals used to denote the same or substantially similar components.

The seal 1000 includes a first face 1002, a second face 1004 (FIG. 22), the one or more mechanical fasteners 74, the encasing layer 78 and a seal body 1006. The one or more mechanical fasteners 74 in this example are not coupled to one or more frames 76, but rather, the one or more mechanical fasteners 74 are coupled to the seal body 1006. It will be understood that the seal 1000 can include one or more frames, similar to the one or more frames 76, if desired.

As discussed with regard to the seal 22, the encasing layer 78 includes the fabric layer 82 and the coating layer 84. The fabric layer 82 is composed of any suitable fiber, such as ceramic, basalt, graphite, glass fiber (E-glass, S-glass, H-glass, R-glass, AR-glass), fiberglass and combinations thereof, and the coating layer 84 is composed of vermiculite, mica, polytetrafluoroethylene (PTFE), silicone or a hydrophobic coating. The encasing layer 78 can be coupled about the seal body 1006 and sewn together at the seam 90, with a suitable thread, such as the ceramic thread discussed with regard to the seal 22.

Figure 22:
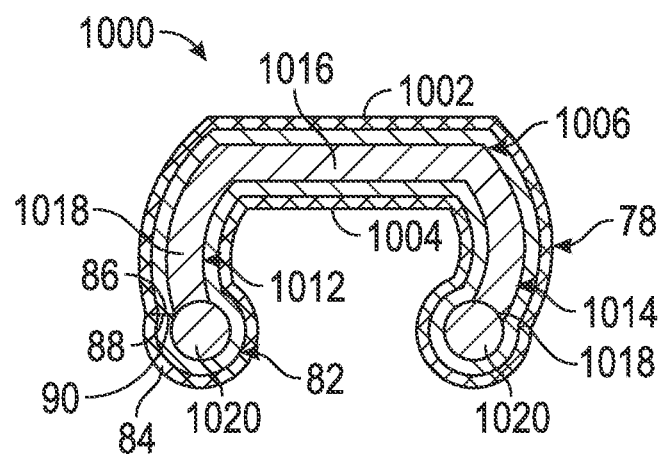
FIG. 22 is a cross-sectional view of the device of FIG. 21, taken along line 22-22 of FIG. 21.

The first face 1002 is coupled to a first component via the one or more mechanical fasteners 74 and seals against a surface of the first component. With reference to FIG. 22, the second face 1004 is coupled to a second component and seals against a surface of the second component. In the example illustrated in FIG. 21, the seal 1000 is sized to extend about a rectangular opening, and thus, the seal 1000 is substantially rectangular and includes a curved radius at corners of the seal 1000. It should be understood, however, that the size and shape of the seal 1000 is merely exemplary. In this regard, the seal 1000 can be circular or have any polygonal shape that corresponds to the shape of the surfaces against which the seal 1000 contacts for sealing.

With reference to FIG. 22, the seal body 1006 is disposed within the fabric layer 82 and the coating layer 84 of the encasing layer 78. It should be noted that while the encasing layer 78 is illustrated as enclosing the seal body 1006 with a shape that substantially corresponds to the seal body 1006, the encasing layer 78 can have any desired shape. In one example, the seal body 1006 is an energized seal body for sealing against two parts. The seal body 1006 can be composed of any suitable material, such as a metal or metal alloy. In one example, the seal body 1006 is composed of a weldable metal or metal alloy such as Inconel™, stainless steel, a cobalt-nickel alloy, or a nickel based alloy having a melting point greater than about 2000 degrees Fahrenheit with little to no oxidation.

In this example, the seal body 1006 comprises a generally U-shaped body. The seal body 1006 includes a first arm 1012, a second arm 1014 and a base 1016. The first arm 1012 and the second arm 1014 are each coupled to the base 1016, and a terminal end 1018 of each of the first arm 1012 and the second arm 1014 includes a grip surface 1020. The grip surface 1020 can couple the second face 1004 to the second component to couple the seal 1000 to the second component.

With reference to FIG. 19, the seal body 1006 also includes a first end 1022 and a second end 1024. The first end 1022 can be coupled to the second end 1024 via welding, for example, to form the rectangular shape of the seal 1000, but it should be understood that any suitable technique can be used to couple the first end 1022 to the second end 1024, such as mechanical fasteners. Furthermore, the seal body 1006 can be composed of a plurality of body segments, each having the first end 1022 and the second end 1024, which can be coupled together to define the shape of the seal 1000.

Figure 23:
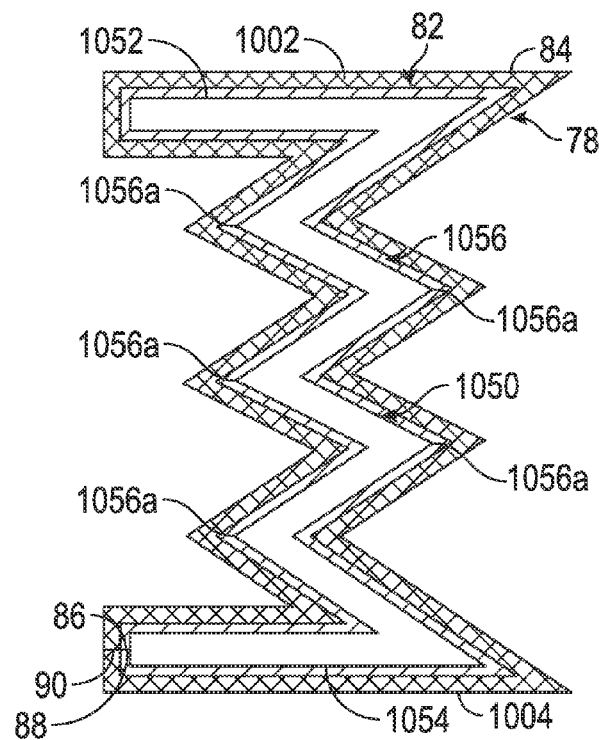
FIG. 23 is an alternative cross-sectional view of the device of FIG. 21, taken along line 22-22 of FIG. 21.

It should be noted that the seal body 1006 illustrated in FIG. 22 is merely exemplary. In this regard, the seal 1000 can include a seal body 1050, as illustrated in FIG. 23. The seal body 1050 is disposed within the fabric layer 82 and the coating layer 84 of the encasing layer 78. It should be noted that while the encasing layer 78 is illustrated as enclosing the seal body 1050 with a shape that substantially corresponds to the seal body 1050, the encasing layer 78 can have any desired shape. In one example, the seal body 1050 is an energized seal body for sealing against two parts. The seal body 1050 can be composed of any suitable material, such as a metal or metal alloy. In one example, the seal body 1050 is composed of a weldable metal or metal alloy such as Inconel™, stainless steel, a cobalt-nickel alloy, or a nickel based alloy having a melting point greater than about 2000 degrees Fahrenheit with little to no oxidation.

In this example, the seal body 1050 comprises a first leg 1052, a second leg 1054 and a baffle 1056. The first leg 1052 and the second leg 1054 each extend generally planar to a longitudinal axis of the seal body 1050. The baffle 1056 extends between the first leg 1052 and the second leg 1054. The baffle 1056 includes a plurality of folds 1056a between the first leg 1052 and the second leg 1054, with the fold line extending substantially traverse to the longitudinal axis of the seal body 1050. It should be noted that the number of folds illustrated herein is merely exemplary, as the baffle 1056 can include any number of folds.

As the seal 1000 can be assembled in a manner similar to that described above in connection with the seal 22, the assembly of the seal 1000 will not be discussed in great detail herein. In addition, it should be noted that the seal 1000 can be used between any two surfaces, including the surfaces illustrated in conjunction with FIG. 1.

Figure 24:
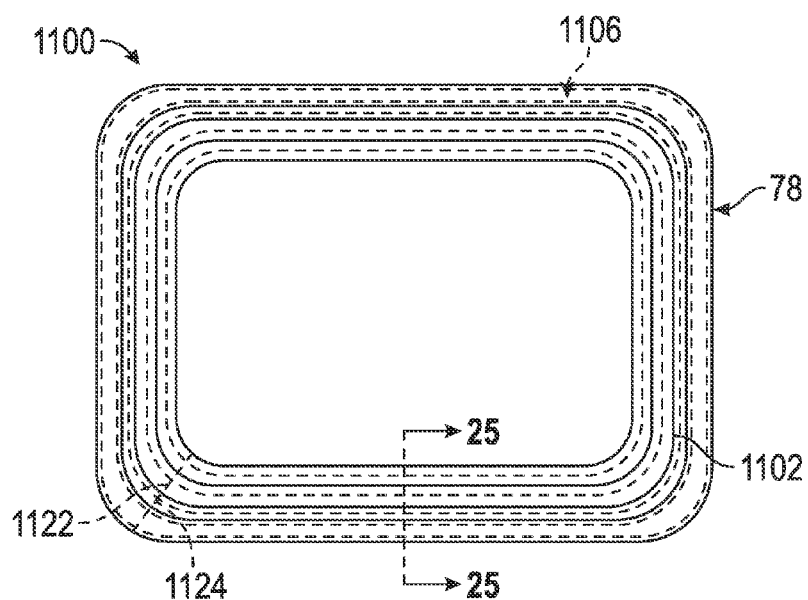
FIG. 24 is a top view illustrating a device with improved heat resistance in accordance with various embodiments.

With reference now to FIG. 24, a seal 1100 is shown. As the seal 1100 can be similar to the seal 22 discussed with regard to FIGS. 1-4, only the differences between the seal 22 and the seal 1100 will be discussed in detail herein, with the same reference numerals used to denote the same or substantially similar components.

Figure 25:
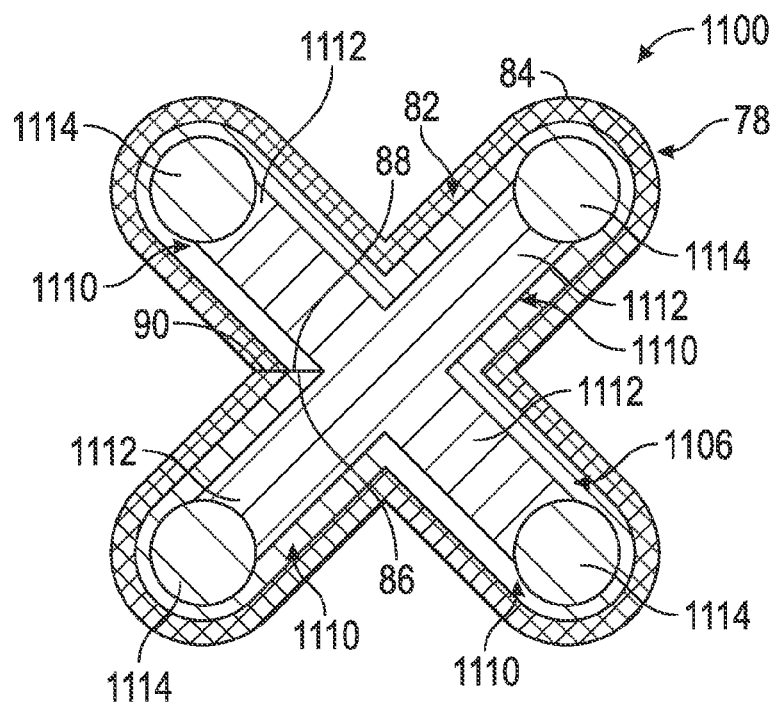
FIG. 25 is a cross-sectional view of the device of FIG. 24, taken along line 25-25 of FIG. 24.

The seal 1100 includes a first face 1102, a second face 1104 (FIG. 25), the encasing layer 78 and a seal body 1106. The first face 1102 is coupled to a first component and seals against a surface of the first component. With reference to FIG. 25, the second face 1104 is coupled to a second component and seals against a surface of the second component. In the example illustrated in FIG. 24, the seal 1100 is sized to extend about a rectangular opening, and thus, the seal 1100 is substantially rectangular and includes a curved radius at corners of the seal 1100. It should be understood, however, that the size and shape of the seal 1100 is merely exemplary. In this regard, the seal 1100 can be circular or have any polygonal shape that corresponds to the shape of the surfaces against which the seal 1100 contacts for sealing.

With reference to FIG. 25, the seal body 1106 is disposed within the fabric layer 82 and the coating layer 84 of the encasing layer 78. It should be noted that while the encasing layer 78 is illustrated as enclosing the seal body 1106 with a shape that substantially corresponds to the seal body 1106, the encasing layer 78 can have any desired shape. As discussed with regard to the seal 22, the fabric layer 82 is composed of any suitable fiber, such as ceramic, basalt, graphite, glass fiber (E-glass, S-glass, H-glass, R-glass, AR-glass), fiberglass and combinations thereof, and the coating layer 84 is composed of vermiculite, mica, polytetrafluoroethylene (PTFE), silicone or a hydrophobic coating. The encasing layer 78 can be coupled about the seal body 1106 and sewn together at the seam 90, with a suitable thread, such as the ceramic thread discussed with regard to the seal 22.

In one example, the seal body 1106 is an energized seal body for sealing against two parts. The seal body 1106 can be composed of any suitable material, such as a metal or metal alloy. In one example, the seal body 1106 is composed of a weldable metal or metal alloy such as Inconel™, stainless steel, a cobalt-nickel alloy, or a nickel based alloy having a melting point greater than about 2000 degrees Fahrenheit with little to no oxidation.

In this example, the seal body 1106 comprises a generally X-shaped body. In this regard, the seal body 1106 includes a plurality of arms 1110 that define the X-shaped body. Each of the arms 1110 includes a terminal end 1112 having a grip surface 1114. The grip surface 1114 can couple or hold the seal body 1106 to the first component and the second component to couple the seal 1100 to the first component and the second component.

With reference to FIG. 24, the seal body 1106 also includes a first end 1122 and a second end 1124. The first end 1122 can be coupled to the second end 1124 via welding, for example, to form the rectangular shape of the seal 1100, but it should be understood that any suitable technique can be used to couple the first end 1122 to the second end 1124, such as mechanical fasteners. Furthermore, the seal body 1106 can be composed of a plurality of body segments, each having the first end 1122 and the second end 1124, which can be coupled together to define the shape of the seal 1100.

As the seal 1100 can be assembled in a manner similar to that described above in connection with the seal 22, the assembly of the seal 1100 will not be discussed in great detail herein. In addition, it should be noted that the seal 1100 can be used between any two surfaces, including the surfaces illustrated in conjunction with FIG. 1.

Figure 26:
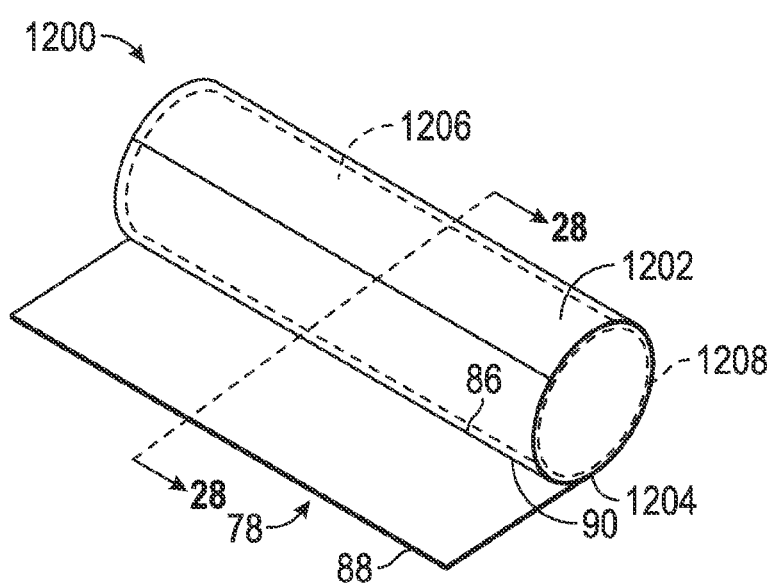
FIG. 26 is a perspective view illustrating a device with improved heat resistance in accordance with various embodiments.

With reference now to FIG. 26, a seal 1200 is shown. As the seal 1200 can be similar to the seal 22 discussed with regard to FIGS. 1-4, only the differences between the seal 22 and the seal 1200 will be discussed in detail herein, with the same reference numerals used to denote the same or substantially similar components.

In one example, the seal 1200 includes a first face 1202, a second face 1204, one or more frames 1206, the encasing layer 78 and a seal body 1208. The first face 1202 seals against a first component. The second face 1204 seals against a second component. In the example illustrated herein, the seal 1200 is a tadpole or P-shaped seal, however, the size and shape of the seal 1200 is merely exemplary.

Figure 27:
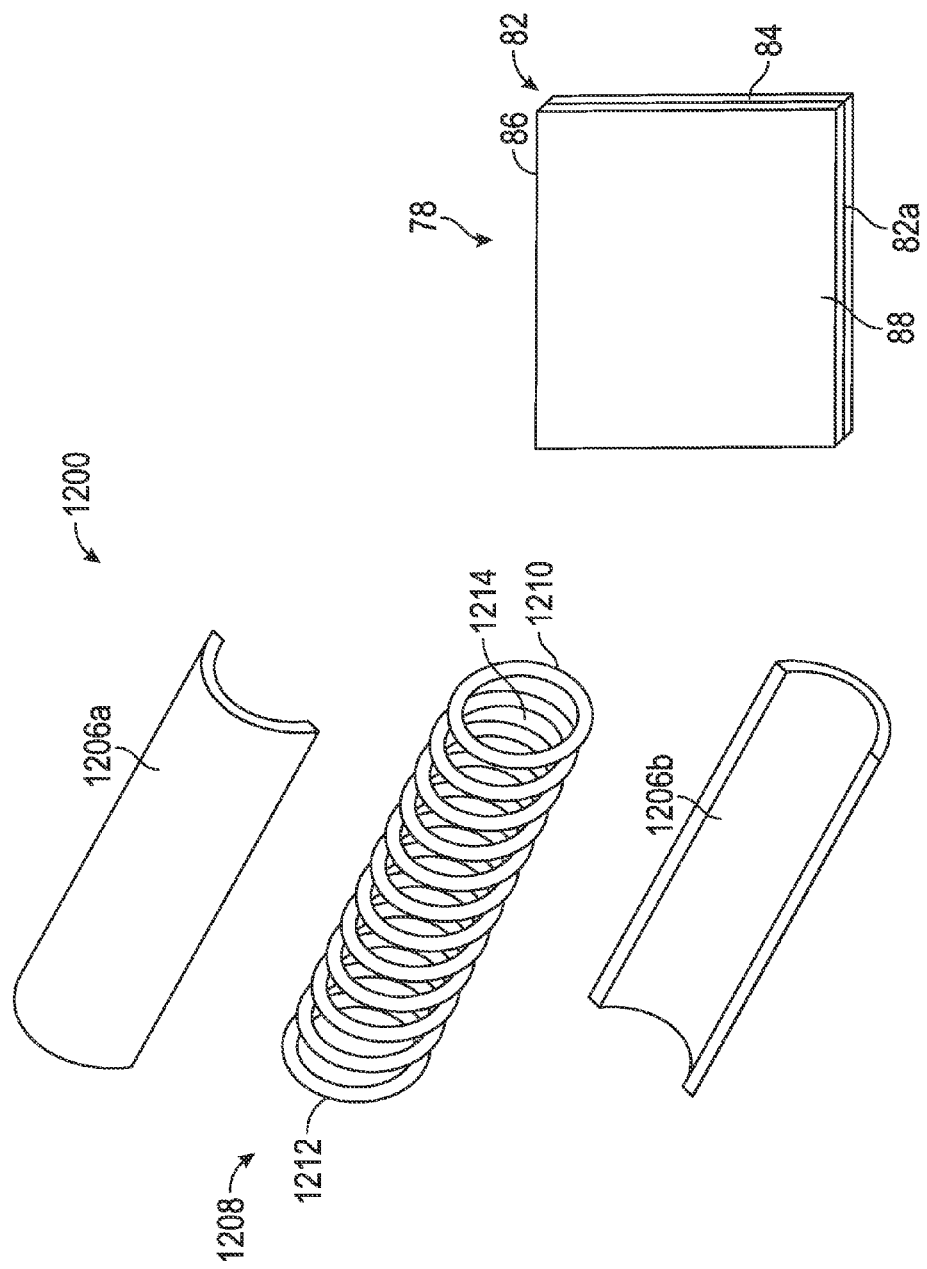
FIG. 27 is a schematic exploded view of the device of FIG. 26.

With reference to FIG. 27, the one or more frames 1206 generally extend along one or both of the first face 1202 and the second face 1204. In one example, the seal 1200 includes a first frame 1206a adjacent to the first face 1202 and a second frame 1206b adjacent to the second face 1204. The frames 1206a, 1206b can be composed of any suitable material with a high melting point, such as a melting point greater than about 2000 degrees Fahrenheit. In one example, the frames 1206a, 1206b are composed of a weldable metal or metal alloy such as Inconel™, stainless steel, a cobalt-nickel alloy, or a nickel based alloy having a melting point greater than about 2000 degrees Fahrenheit with little to no oxidation. Generally, the frames 1206a, 1206b are composed as the same material as the seal body 1208, however, the frames 1206a, 1206b and the seal body 1208 can be composed of different materials, if desired. The frames 1206a, 1206b can have any desired thickness along the first face 1202 and the second face 1204, and is generally less than about 0.030 inches (in.). It should be noted that the thickness illustrated and described herein is merely exemplary, and further, the frame 1206a can have a different thickness than the frame 1206b, if desired.

In this example, with continued reference to FIG. 27, the frames 1206a, 1206b are generally arcuate, such that the frames 1206a, 1206b are slightly concave to correspond to the shape of the seal body 1208. The frames 1206a, 1206b are coupled to opposing sides of the seal body 1208 such that the frame 1206a is opposite the frame 1206b. It should be noted that the shape of the frames 1206a, 1206b need not be concave, but that the frames 1206a, 1206b can have any desired shape to conform with the seal body 1208. The frames 1206a, 1206b also generally include rounded corners such that the frames 1206a, 1206b do not have sharp edges. The frames 1206a, 1206b serve to distribute pressure evenly along the seal body 1208.

With reference back to FIG. 26, the frames 1206a, 1206b and the seal body 1208 is disposed within the fabric layer 82 and the coating layer 84 of the encasing layer 78. In one example, the seam 90 of the fabric layer 82 is located a distance from the second end 88 of the fabric layer 82 to form the tadpole or P-shape of the seal 1200. As discussed with regard to the seal 22, the fabric layer 82 is composed of any suitable fiber, such as ceramic, basalt, graphite, glass fiber (E-glass, S-glass, H-glass, R-glass, AR-glass), fiberglass and combinations thereof, and the coating layer 84 is composed of vermiculite, mica, polytetrafluoroethylene (PTFE), silicone or a hydrophobic coating. The encasing layer 78 can be coupled about the frames 1206a, 1206b and the seal body 1208 and sewn together at the seam 90, with a suitable thread, such as the ceramic thread discussed with regard to the seal 22.

The seal body 1208 is an energized seal body for sealing against two parts. In this example, with reference to FIG. 27, the seal body 1208 comprises a coil spring. The coil spring of the seal body 1208 can be composed of any suitable material, such as a metal or metal alloy. In one example, the coil spring of the seal body 1208 is composed of a weldable metal or metal alloy such as Inconel™, stainless steel, a cobalt-nickel alloy, or a nickel based alloy having a melting point greater than about 2000 degrees Fahrenheit with little to no oxidation.

Figure 28:
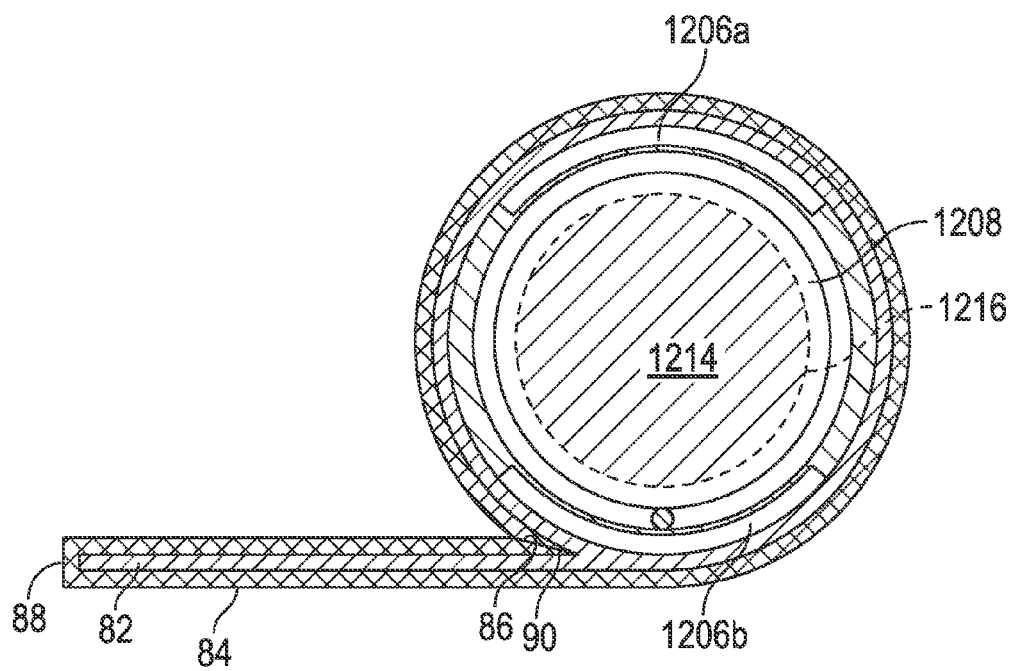
FIG. 28 is a cross-sectional view of the device of FIG. 26, taken along line 28-28 of FIG. 26.

The seal body 1208 includes a first end 1210, a second end 1212 and a cavity 1214 between the first end 1210 and the second end 1212. With reference to FIG. 28, the cavity 1214 can be filled with a material 1216, if desired. For example, the material 1216 can comprise a ceramic, graphite, basalt, fiberglass and combinations thereof. The filling of the cavity 1214 with the material 1216 can reduce the permeability of gases through the seal 1200.

In order to assemble the seal 1200, in one example, the cavity 1214 is filled or packed with the material 1216, if desired. The frames 1206a, 1206b, are coupled to the opposing ends of the seal body 1208. The fabric layer 82, with the coating layer 84 already applied or disposed on the exterior surface 82a, is wrapped around the frames 1206a, 1206b and the seal body 1208, so as to substantially enclose the entire seal body 1208. With the seal body 1208 disposed adjacent to the first end 86 of the fabric layer 82, the first end 86 of the fabric layer 82 is sewn to form the tadpole or P-shape of the seal 1200. It should be noted that the seal 1200 can be used between any two surfaces.

Figure 29:
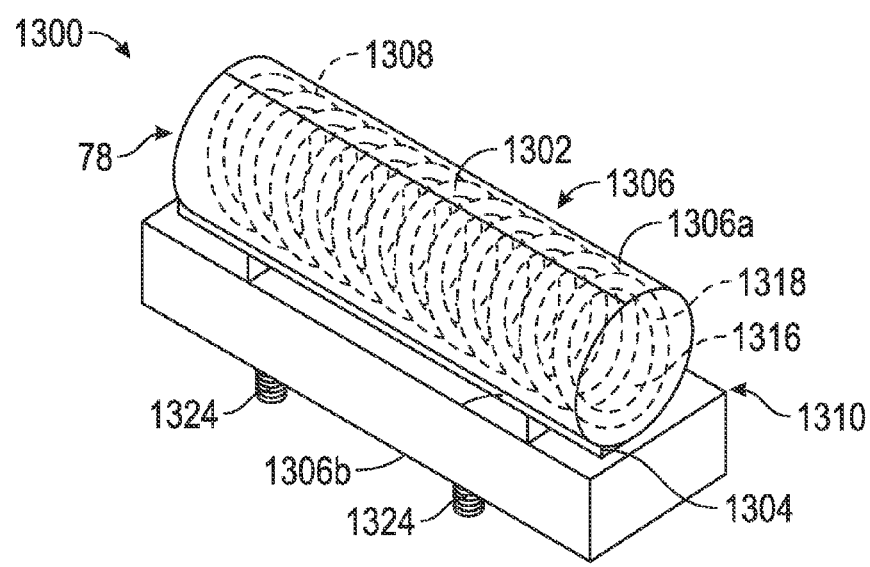
FIG. 29 is a perspective view illustrating a device with improved heat resistance in accordance with various embodiments.

With reference now to FIG. 29, a seal 1300 is shown. As the seal 1300 can be similar to the seal 22 discussed with regard to FIGS. 1-4, only the differences between the seal 22 and the seal 1300 will be discussed in detail herein, with the same reference numerals used to denote the same or substantially similar components.

In one example, the seal 1300 includes a first face 1302, a second face 1304, one or more frames 1306, the encasing layer 78, a seal body 1308 and a base 1310. The first face 1302 seals against a first component. The second face 1304 seals against a second component. In the example illustrated herein, the seal 1300 is an omega seal, however, the size and shape of the seal 1300 is merely exemplary.

With reference to FIG. 29, the one or more frames 1306 generally extend along one or both of the first face 1302 and the second face 1304. In one example, the seal 1300 includes a first frame 1306a adjacent to the first face 1302 and a second frame 1306b adjacent to the second face 1304. The frames 1306a, 1306b can be composed of any suitable material with a high melting point, such as a melting point greater than about 2000 degrees Fahrenheit. In one example, the frames 1306a, 1306b are composed of a weldable metal or metal alloy such as Inconel™, stainless steel, a cobalt-nickel alloy, or a nickel based alloy having a melting point greater than about 2000 degrees Fahrenheit with little to no oxidation. Generally, the frames 1306a, 1306b are composed as the same material as the seal body 1308, however, the frames 1206a, 1206b and the seal body 1308 can be composed of different materials, if desired. The frames 1306a, 1306b can have any desired thickness along the first face 1302 and the second face 1304, and is generally less than about 0.030 inches (in.). It should be noted that the thickness illustrated and described herein is merely exemplary, and further, the frame 1306a can have a different thickness than the frame 1306b, if desired.

Figure 30:
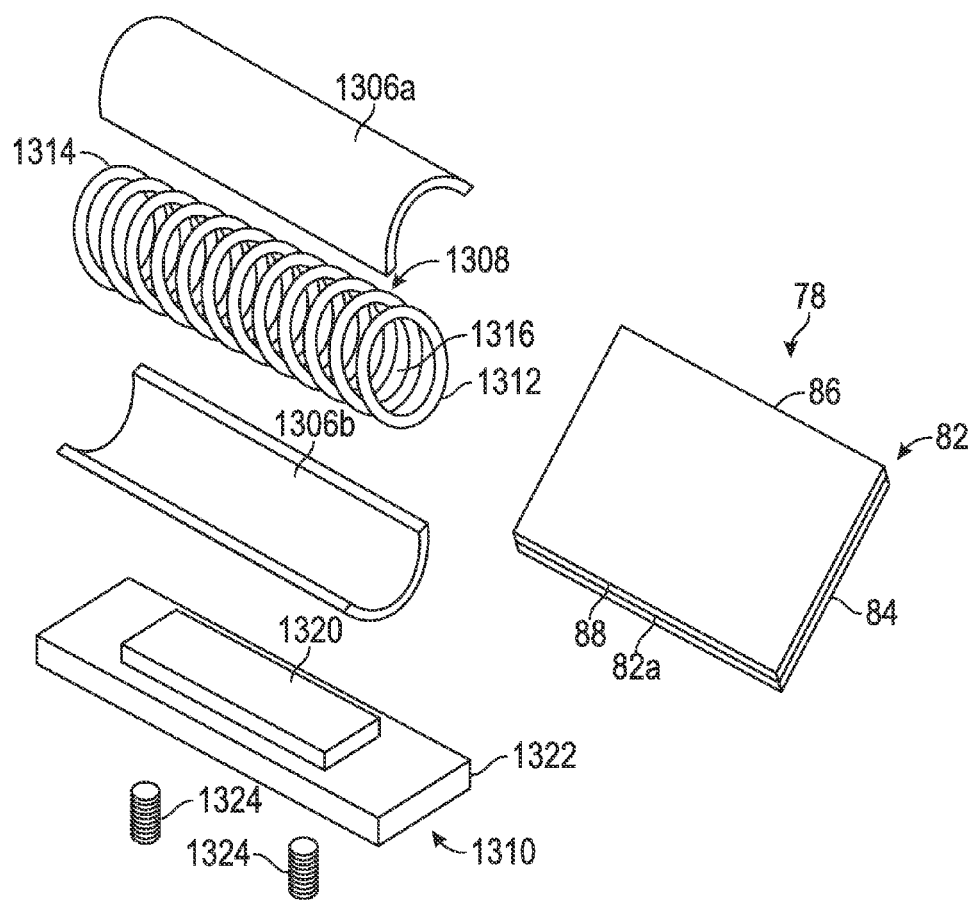
FIG. 30 is a schematic exploded view of the device of FIG. 29.

In this example, with continued reference to FIG. 30, the frames 1306a, 1306b are generally arcuate, such that the frames 1306a, 1306b are slightly concave relative to the seal body 1308. The frames 1306a, 1306b are coupled to the seal body 1308 such that the frames 1306a, 1306b are disposed on opposing sides of the seal body 1308. It should be noted that the shape of the frames 1306a, 1306b need not be concave, but that the frames 1306a, 1306b can have any desired shape to conform to the seal body 1308. The frames 1306a, 1306b also generally include rounded corners such that the frames 1306a, 1306b do not have sharp edges. The frames 1306a, 1306b serve to distribute pressure evenly along the seal body 1308.

With reference back to FIG. 29, the seal body 1308 is disposed within the encasing layer 78. As discussed with regard to the seal 22, the encasing layer 78 includes the fabric layer 82 and the coating layer 84. The fabric layer 82 is composed of any suitable fiber, such as ceramic, basalt, graphite, glass fiber (E-glass, S-glass, H-glass, R-glass, AR-glass), fiberglass and combinations thereof, and the coating layer 84 is composed of vermiculite, mica, polytetrafluoroethylene (PTFE), silicone or a hydrophobic coating. The encasing layer 78 can be coupled about the frames 1306a, 1306b and the seal body 1308 and sewn together at the seam 90, with a suitable thread, such as the ceramic thread discussed with regard to the seal 22.

The seal body 1308 is an energized seal body for sealing against two parts. In this example, with reference to FIG. 30, the seal body 1308 comprises a coil spring. The coil spring of the seal body 1308 can be composed of any suitable material, such as a metal or metal alloy. In one example, the coil spring of the seal body 1308 is composed of a weldable metal or metal alloy such as Inconel™, stainless steel, a cobalt-nickel alloy, or a nickel based alloy having a melting point greater than about 2000 degrees Fahrenheit with little to no oxidation.

The seal body 1308 includes a first end 1312, a second end 1314 and a cavity 1316 between the first end 1312 and the second end 1314. With reference to FIG. 29, the cavity 1316 can be filled with a material 1318, if desired. For example, the material 1318 can comprise a ceramic, graphite, basalt, fiberglass and combinations thereof. The filling of the cavity 1316 with the material 1318 can reduce the permeability of gases through the seal 1300.

With reference to FIG. 30, the base 1310 can support the seal body 1308. In one example, the base 1310 includes a first base portion 1320 and a second base portion 1322. The first base portion 1320 and the second base portion 1322 can be formed of a suitable metal or metal alloy, such as Inconel™, stainless steel, a cobalt-nickel alloy, or a nickel based alloy, for example. The first base portion 1320 can be coupled to the frame 1306b through welding, for example, and the first base portion 1320 can be welded to the second base portion 1322. The use of welding is merely exemplary, as the first base portion 1320 can be coupled between the frame 1306b and the second base portion 1322 through any suitable technique, and further, the first base portion 1320 can be optional. The second base portion 1322 can be coupled to the first base portion 1320 and can be coupled to the second component. In one example, the second base portion 1322 includes one or more mechanical fasteners 1324. The one or more mechanical fasteners 1324 can comprise threaded studs, for example, similar to the one or more mechanical fasteners 74. The one or more mechanical fasteners 1324 can receive a nut to couple the second base portion 1322, and thus, the seal 1300 to the second component.

In order to assemble the seal 1300, in one example, with reference to FIG. 30, the cavity 1316 is filled or packed with the material 1318, if desired. The frames 1306a, 1306b, are coupled to opposing sides of the seal body 1308. The fabric layer 82, with the coating layer 84 already applied or disposed on the exterior surface 82a, is wrapped around the seal body 1308, so as to substantially enclose the frames 1306a, 1306b and the entire seal body 1308. The first end 86 of the fabric layer 82 is sewn to the second end 88 of the fabric layer 82 to form the seam 90 about the perimeter of the seal body 1308. With the first base portion 1320 coupled to the second base portion 1322, the base 1310 is coupled to the encasing layer 78. It should be noted that the seal 1300 can be used between any two surfaces, including the surfaces illustrated in conjunction with FIG. 1.

Figure 31:
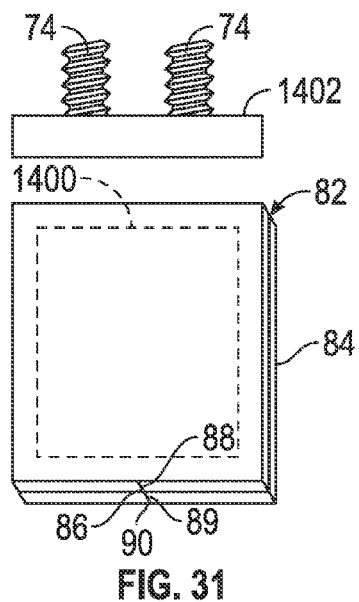
FIG. 31 is a schematic illustration of a device with improved heat resistance in accordance with various embodiments.

It will be understood that while the device with improved heat resistance is described and illustrated herein as comprising a seal with a seal body, the teachings of the present disclosure are not so limited. In this regard, with reference to FIG. 31, a device with improved heat resistance 1400 can include a body 1402 comprising a gasket, a duct, a hose, a bellow or a joint. The device 1400 can include the encasing layer 78, which can be disposed substantially entirely around the body 1402. The first end 86 and the second end 88 of the fabric layer 82 can be sewn together by a suitable thread, such as the ceramic thread 89, at the seam 90, which can extend about the perimeter of the body 1402. The coating layer 84 is disposed on the fabric layer 82, and thus, substantially surrounds the body 1402. If desired, one or more frames 1404, similar to the one or more frames 76, can be coupled to the body 1402. The one or more frames 1404 can include the one or more mechanical fasteners 74. In addition, if the body 1402 includes an aperture, the encasing layer 78 can extend along an exterior surface and an interior surface of the body 1402, thereby allowing fluid to flow through the aperture of the body 1402 while providing improved heat resistance. Thus, the teachings of the present disclosure are applicable to a wide variety of devices to provide improved heat resistance.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A device with improved heat resistance, comprising:
a body having a first side opposite a second side;
a first frame coupled to the body that extends along the first side of the body, the first frame including at least one mechanical fastener;
a second frame coupled to the body that extends along the second side of the body;
an encasing layer disposed substantially entirely around the body, the first frame and the second frame, the encasing layer including a fabric layer, a coating and at least one bore through which the at least one mechanical fastener extends;
the fabric layer having a first end and a second end coupled together about the perimeter of the body to enclose the body, the fabric layer including an exterior surface; and
the coating disposed on the exterior surface of the fabric layer, and the coating forms a barrier for the fabric layer.

2. The device of claim 1, wherein the body is a seal body.

3. The device of claim 2, wherein the seal body is a coil spring.

4. The device of claim 2, wherein the seal body defines a cavity, and the cavity is filled with a material.

5. The device of claim 4, wherein the material is selected from the group comprising: ceramic, graphite, basalt, fiberglass, and combinations thereof.

6. The device of claim 2, wherein the seal body has a first end and a second end, and the first end is coupled to the second end.

7. The device of claim 1, wherein the fabric layer is composed of a material selected from the group comprising: ceramic, basalt, graphite, glass fiber, fiberglass, and combinations thereof.

8. The device of claim 1, wherein the coating is composed of a material selected from the group comprising: vermiculite, mica, polytetrafluoroethylene (PTFE), silicone, a hydrophobic coating, and combinations thereof.

9. The device of claim 1, wherein the first end of the fabric layer is coupled to the second end of the fabric layer to form a seam extending about a perimeter of the body.

10. The device of claim 9, wherein the first end and the second end of the fabric layer are sewn together via a thread.

11. The device of claim 10, wherein the thread is ceramic thread.

12. A device with improved heat resistance, comprising:
a body having a first end, a second end and a first side opposite a second side, the first end coupled to the second end to form a closed perimeter;
a first frame coupled to the body that extends along the first side of the body;
a second frame coupled to the body that extends along the second side of the body;
an encasing layer disposed substantially entirely around the body, the first frame and the second frame, the encasing layer including a fabric layer and a coating;
the fabric layer having a first end and a second end sewn together about the perimeter of the body at a seam to enclose the body, the fabric layer including an exterior surface; and
the coating disposed on the exterior surface of the fabric layer, and the coating forms a barrier for the fabric layer.

13. The device of claim 12, wherein the body is a seal body.

14. The device of claim 12, wherein the fabric layer is composed of a material selected from the group comprising: ceramic, basalt, graphite, glass fiber, fiberglass, and combinations thereof.

15. The device of claim 12, wherein the coating is composed of a material selected from the group comprising: vermiculite, mica, polytetrafluoroethylene (PTFE), silicone, a hydrophobic coating, and combinations thereof.

16. The device of claim 12, wherein the first end and the second end of the fabric layer are sewn together via a ceramic thread.

17. The device of claim 12, wherein the body is composed of a metal or metal alloy.

18. The device of claim 12, wherein the device further comprises a plurality of mechanical fasteners, with at least one of the plurality of mechanical fasteners coupled to the first frame and at least one of the plurality of mechanical fasteners couple to the second frame, and the respective at least one of the plurality of mechanical fasteners extend through bores defined in the encasing layer.

19. A device with improved heat resistance, comprising:
a seal body having a first end, a second end and a first side opposite a second side;
a first frame coupled to the seal body that extends along the first side of the seal body, the first frame including at least one mechanical fastener;
a second frame coupled to the seal body that extends along the second side of the seal body;

an encasing layer disposed substantially entirely around the seal body, the first frame and the second frame, the encasing layer including a fabric layer, a coating and at least one bore through which the at least one mechanical fastener extends;

the fabric layer having a first end and a second end sewn together with a ceramic thread about the perimeter of the seal body at a seam to enclose the seal body, the fabric layer including an exterior surface; and the coating disposed on the exterior surface of the fabric layer, and the coating forms a barrier for the fabric layer.

* * * * *

UNITED STATES PATENT AND TRADEMARK OFFICE
CERTIFICATE OF CORRECTION

PATENT NO.         : 9,618,120 B2                                    Page 1 of 1
APPLICATION NO.    : 14/607415
DATED              : April 11, 2017
INVENTOR(S)        : Duncan It is certified that error appears in the above-identified patent and that said Letters Patent is hereby corrected as shown below:

In the Claims

Column 24, Line 57, delete "couple" and insert --coupled--.

Signed and Sealed this
Thirty-first Day of October, 2017

Joseph Matal
*Performing the Functions and Duties of the
Under Secretary of Commerce for Intellectual Property and
Director of the United States Patent and Trademark Office*